(12) United States Patent
Green et al.

(10) Patent No.: US 6,559,223 B2
(45) Date of Patent: May 6, 2003

(54) HYDROGELS AND METHODS FOR THEIR PRODUCTION

(75) Inventors: Mark M. Green, New York, NY (US); Sung Yun Yang, Cambridge, MA (US)

(73) Assignee: Polytechnic University, Brooklyn, NY (US)

( * ) Notice: Subject to any disclaimer, the term of this patent is extended or adjusted under 35 U.S.C. 154(b) by 0 days.

(21) Appl. No.: 09/790,739

(22) Filed: Feb. 22, 2001

(65) Prior Publication Data

US 2002/0161058 A1 Oct. 31, 2002

(51) Int. Cl.⁷ ............... B01J 13/00; C08F 2/48; C08F 2/50; C08L 33/26
(52) U.S. Cl. ............... 524/831; 516/99; 522/9; 522/33; 522/175; 522/183; 522/904; 522/905; 524/916; 525/329.4; 525/936
(58) Field of Search .............. 516/98, 99; 264/4.7; 522/9, 33, 905, 175, 183, 904; 524/831, 916; 525/329.4, 936; 514/944

(56) References Cited

U.S. PATENT DOCUMENTS

| | | | | |
|---|---|---|---|---|
| 3,826,756 A | * | 7/1974 | Bachmann et al. | 264/4.7 |
| 4,532,183 A | * | 7/1985 | Shackle et al. | 264/4.7 X |
| 4,741,872 A | * | 5/1988 | De Luca et al. | 264/4.7 |
| 4,794,166 A | * | 12/1988 | Engelhardt et al. | 524/916 X |
| 5,391,406 A | * | 2/1995 | Ramharack et al. | 427/516 |
| 5,506,279 A | * | 4/1996 | Babu et al. | 522/904 X |
| 5,726,456 A | * | 3/1998 | Lupton et al. | 264/4.7 X |
| 5,976,648 A | * | 11/1999 | Li et al. | 524/916 X |
| 6,007,833 A | * | 12/1999 | Chudzik et al. | 522/905 X |
| 6,019,998 A | * | 2/2000 | Nomoto et al. | 264/4.7 X |
| 6,103,865 A | * | 8/2000 | Bae et al. | 525/329.4 X |
| 6,197,173 B1 | * | 3/2001 | Kirkpatrick | 522/33 X |
| 6,262,141 B1 | * | 7/2001 | Cywar et al. | 524/831 X |

FOREIGN PATENT DOCUMENTS

| | | | | |
|---|---|---|---|---|
| JP | 49-38884 | * | 4/1974 | 264/4.7 |

* cited by examiner

*Primary Examiner*—Richard D. Lovering
(74) *Attorney, Agent, or Firm*—Straub & Pokotylo; John C. Pokotylo

(57) ABSTRACT

Forming graft copolymers in water using labeling of water soluble polymers with photoinitiators. Water soluble polymers can form environmentally responsive hydrophobically stimulated cages. The cages, which contain initiating radicals after irradiation, may be "opened" or "closed" by changes in environmental conditions. When the cage is closed, the radicals are trapped inside and thus do not cause substantial polymerization of water soluble monomers in the same solution. When the cage is closed, the radicals escape and cause polymerization. In another variation, hydrogels and graft copolymers are formed by covalently linking phototoinitiator groups to water soluble polymers that do not form cages. Thus, monomers may form grafts to the polymer, allowing formation of physical hydrogels. The physical hydrogels formed in either case show properties responsive to pH, salt and/or solvent composition, so that the hydrogels may be rendered to a powder by addition of non-solvents and these powders can reform the gels.

42 Claims, 18 Drawing Sheets

(a) at low pH (b) at high pH (a) at low pH (b) at high pH

HYDROGELS AND METHODS FOR THEIR PRODUCTION

§ 0. GOVERNMENT RIGHTS

The US Government may have certain rights in this invention pursuant to grants awarded by the National Science Foundation and the Office of Naval Research.

§ 1. BACKGROUND

§ 1.1 Field of the Invention

The present invention relates to the field of polymers and, in particular, to polymerization, such as the photoinitiated polymerization of water soluble reactive monomers by radicals.

§ 1.2 Related Art

A first aspect of the present invention concerns polymerization and the cage effect. These topics are introduced in §§ 1.2.1 and 1.2.2, respectively, below. A second aspect of the present invention concerns hydrogels, which may be produced by the first aspect of the invention. Hydrogels are introduced in § 1.2.3 below.

§ 1.2.1 Photoinitiated Polymerization

The field of photointiated polymerizations is a subject of intense scientific and industrial study. Many applications such as photoresists, flexographic printing plates, photopolymerizable inks, coatings, and adhesives have been widely used. Yet many aspects of photopolymerization are incompletely understood and not subject to the utmost possibility of control.

Water-based photopolymerizations have a special advantage in protection of the environment. The development of water-soluble photoinitiators is under active development and new methods need to be created to control such photopolymerizations.

§ 1.2.2 The "Cage Effect"

The concept of the "cage effect" was introduced in 1934 to explain why the efficiency of $I_2$ photodissociation was less in solution than in the gas (Frank, J.; Rabinowitch, E., *Trans. Faraday Soc.*, 30, 120 (1934). This article is incorporated herein by reference.). Frank and Rabinowitch proposed that the solvent temporarily encapsulates the reactive iodide radical atoms in a solvent cage causing the radicals to remain as colliding neighbors before they either recombine or diffuse apart.

The cage effect has been widely used to explain many fundamental reaction phenomena; for example, magnetic isotope effects (Turro, N. J.,*J. Proc. Nat. Acad. Sci.,* 80, 609 (1983). Lott, W. B.; Chagovetz, A. M.; Grissom, C. B., *J. Am. Chem. Soc.,* 117, 12194 (1995). These articles are incorporated herein by reference.), chemically induced dynamic nuclear polarization effects (Closs, G., *J. Am. Chem. Soc.,* 91, 4552 (1969). This article is incorporated herein by reference.), rate-viscosity correlations (Tanner, D. D.; Meintzer, C. P.; Tsai, E. C.; Oumar-Mahamat, H.,*J. Am. Chem. Soc.,* 112, 7369 (1990). This article is incorporated herein by reference.), variations in products and yields as a function of the medium (Koenig, T.; Deinzer, M.; Hoobler, J. A., *J. Am. Chem. Soc.,* 93, 938 (1971). This article is incorporated herein by reference.) and variations in quantum yields as a function of the medium (Abram, I.; Milne, F.; Steel, C., *J. Am. Chem. Soc.,* 86, 745 (1969). This article is incorporated herein by reference.). The cage effect arising from solvent is important in explaining the kinetics including the initiation, propagation, and termination steps, of radical polymerization reactions. (Odian, G., *Principles of Polymerization:* 3$^{rd}$ ed., (Wiley-Interscience: New York, 1991). Bosch, P.; Mateo, J. L.; Serrano, J., *J. Photochem. Photobiol. A,* 103, 177 (1997). Tefera, N.; Weickert, G.; Westerterp, K. R., *J. Appl. Polym. Sci.,* 63, 1663 (1997). Wolff, E. -H. P.; Bos, A. N. R., *Ind. Eng. Chem. Res.,* 36, 1163 (1997). These works are incorporated herein by reference.)

Since supramolecular complexation became an intense field of study, cage effects have been one of the most important issues in this field. For example, cyclodextrin has been used as a cage in the study of photochemical reactions of dibenzyl ketones. (Rao, B. N.; Turro, N. J.; Ramamurthy, V., *J. Org. Chem.,* 51, 460 (1986). Rao, B. N.; Syamala, M. S.; Turro, N. J.; Ramamurthy, V., *J. Org. Chem.,* 52, 5517 (1987). These articles are incorporated herein by reference.) To make a long-lasting cage, people have tried to modify cage structures to cause more interactions between the host (cage) and the guest (radical pair). Among these are hydrophobic interactions in aqueous solutions.

Recently, many researchers have focused on the study of radical recombination in micelle systems. (Gould, I. R.; Zimmt, M. B.; Turro, N. J.; Baretz, B. H.; Lehr, G. F.,*J. Am. Chem. Soc.,* 107, 4607 (1985). Wu, C.-H.; Jenks, W. S.; Koptyug, I. V.; Ghatlia, N. D.; Lipson, M.; Tarasov, V. F.; Turro, N. J., *J. Am. Chem. Soc.,* 115, 9583 (1993). These articles are incorporated herein by reference.) Turro et al. have investigated the effects of systematic changes in radical structure (hydrophobicity) and micelle structure. (Turro, N. J.; Wu, C.-H., *J. Am. Chem. Soc.,* 117, 11031 (1995). This article is incorporated herein by reference.)

§ 1.2.3 Hydrogels

Gels are chemically or physically cross-linked networks of polymers that can be swollen by liquids. Among the gels, a hydrogel is a network of hydrophilic polymers in which a large amount of water is present. Because of their relatively high biocompatibility, research on hydrogels has been focused on biomedical applications. (Peppas, N. A. e. a., *Hydrogels in Medicine and Pharmacy; Properties and Applications* (CRC Press, Boca Raton, Fla., 1987) Vol. 3. This work is incorporated herein by reference.) Artificial skin (Chardack, W. N.; Brueske, D. A.; Santomauro, A. p.; Fazekas, G., *Ann. Surg.,* 155, 127 (1962). DeRossi, D., *Polymer Gels* (Plenum Press New York, 1991). These works are incorporated herein by reference.) or contact lenses (Wichterle, O.; D., L., *Nature,* 185, 117, (1960). Wichterle, O.; D., L. U.S. Patent (1961). These works are incorporated herein by reference.) have a long history in the applications of the hydrogels. Recently, drug delivery system using hydrogels became a very fast growing research area. (Peppas, N. A.; Bures, P.; Leobandung, W.; Ichikawa, H., *Eur. J. Pharma. Biopharm,* 50, 27, (2000). This article is incorporated herein by reference.)

§ 1.2.3.1 Physical Hydrogels Differ from Covalently Crosslinked Hydrogels

In physical gels, a gelation occurs through van der Waals or hydrogen bonding or other noncovalent interactions between chains. ("Thermoreversible Gelation of Polymers and Biopolymers, by J. -M. Guenet, 1992, Academic Press. Incorporated herein by reference.) Physical gels require high cooperativity to be stable. For example, the energy involved in van der Waals interaction can be small compared to kT. Consequently, these gels can be reversible.

Most physical hydrogels are biopolymers, such as gelatin gels (Katz, J. R.; Derksen, J. C.; Bon, W. F.,*Rec. Trav. Chim. Pays-Bas,* 50, 725, (1931). This article is incorporated herein by reference.) and polyssacharide gels (Anderson, N. S.; Campbell, J. W.; Harding, M. M.; Rees, D. A.; Samuel, J. w. B., *J. Mol. Biol.,* 45, 85, (1969). This article is incorporated herein by reference.). Gelatin gels (Petzron, I.; Djabourov, M.; Bosio, L.; Leblond, J., *J. Polym. Sci. polym. Phys. Ed.,* 28, 1823, (1990). This article is incorporated herein by reference.) consist of triple helices. Polysaccharide gels are known to be composed of double helices (Hermansson, A. M., *Carbohydr. Polym.,* 10, 163, (1989). This article is incorporated herein by reference.).

There are few examples of physical gels made by synthetic polymers. Poly(vinyl alcohol) (PVA) gels are probably the first system of this kind ever to be studied. (Sone, Y.; Hirabayashi, K.; Sakurada, I., *Kobunshi Kagaku* 10, 1, (1953). Kominami, T.; Naito, R.; Odanaka, H., *Kobunshi Kogaku,* 12, 218, (1955). These articles are incorporated herein by reference.) Very intensive studies of PVA gels have been performed (Peppas, N. A.; Merrill, E. W., *J. Polym. Sci. Polym Chem. Ed.,* (1976). Finch, C. A. *PVA-Properties and Applications* (John Wiley & Sons: New York, 1973). These works are incorporated herein by reference.), including studies of chemically cross-linked PVA gels. (Takamura, T.; Takayarna, G.; Ukida, G., *J. Appl. Polym. Sci.,* 9, 3215, (1965). This article is incorporated herein by reference.) Physical gels are generally "weaker" than chemical gels. For example, the physical cross-linking of a gel can be destroyed by adding large amounts of solvent.

§ 1.2.3.2 Intelligent Hydrogels

The first responsive polymer gel was created by Katchalsky in 1949 by cross-linking water-soluble polyelectroyltes to form gels that swelled and shrank in response to changes in solution pH. (Katchalsky, A., *Experientia,* 5, 319 (1949). This article is incorporated herein by reference.) That gel showed a gradual response to changes in pH. Tanaka (Tanaka, T., *Phys. Rev. lett.,* 40, 820 (1978). This article is incorporated herein by reference.) observed a sharp phase transition in ionized polyacrylamide gels. Since this work, the field of responsive gels has expanded dramatically.

The relatively large and sharp chemical or physical changes of hydrogels in response to small chemical or physical changes has led to some hydrogels being called "intelligent" gels. (Hoffman, A. S., *Macromol. Symp.,* 98, 645 (1995). This article is incorporated herein by reference.) Response of the hydrogel to environmental changes, such as temperature (Hirose, H.; Shibayama, M., *Macomolecules,* 31, 5336 (1998). This article is incorporated herein by reference.), pH (Osada, Y., *Adv. Polym. Sci.,* 82, 1 (1987). This article is incorporated herein by reference.), solvents, electric fields (Kwon, I. C.; Bae, Y. H.; Kim, S. W., *Nature,* 354, 291 (1991). This article is incorporated herein by reference.), light (Suzuki, A.; Tanaka, T., *Nature,* 346, 345 (1990). This article is incorporated herein by reference.), or even a specific protein, (Miyata, T.; Asami, N.; Uragami, T., *Nature,* 399, 766 (1999). This article is incorporated herein by reference.) can cause drastic changes in phase, shape, or surface energy. These characteristics of the hydrogel have been utilized for drug release systems. (Peppas, N. A.; Bures, P.; Leobandung, W.; Ichikawa, H., *Eur. J. Pharma. Biopharm,* 50, 27 (2000). This article is incorporated herein by reference.)

Hydrogen bonding is known as one of the fundamental forces to control the behavior of responsive gels. PMA and PEG are well known for forming polymer complexes by hydrogen bonding in solution. (Osada, Y., *Adv. Polym. Sci.,* 82, 1 (1987). Abe, K.; Koide, M.; Tsuchida, E. *Macromolecules,* 10, 1259 (1977). Bedner, B.; Morawetz, H.; Shafer, J. A., *Macromolecules,* 17, 1634 (1984). Iliopoulos, I.; Audebert, R. A., *Macromolecules,* 24, 2566 (1991). These articles are incorporated herein by reference.) PAAm and PAA are also known as polymers that interact by intra- or intermolecular hydrogen-bonding. (Silberberg, A.; Eliassaf, J.; Katchalsky, A., *J. Polym. Sci.,* 23, 259 (1957). Wang, Y.; Morawetz, H., *Macromolecules,* 22, 164 (1989). These articles are incorporated herein by reference.) Katano et al. (Katono, H.; Maruyama, A.; Sanui, K.; Ogata, N.; Okano, T.; Sakurai, Y., *J. Controlled Release,* 16, 215 (1991). This article is incorporated herein by reference.) have studied the temperature dependence of polymer solubility on the PAA, PAAm in water systems. In aqueous solutions of PAAm-PAA and in related polymer solutions, they observed temperature dependent solubility of the polymer. At low pH, they observed turbidity in the solution. They concluded that the complexation of PAA and PAAm is due to the intermolecular hydrogen bonding between acid and amide groups (See FIG. 13.) and that this might cause precipitation.

Aoki et al. also have studied hydrogen-bonds between PAA and poly(N,N-dimethylacrylamide) (PDMAAm) in interpenetrating polymer network. (Aoki, T.; Masahiko, K.; Katono, H.; Sanui, K.; Ogata, N.; Okano, T.; Sakurai, Y., *Macromoleecules,* 27, 947 (1994). This article is incorporated herein by reference.) In their paper, they proposed that PAA-PDMAAm gel has more efficient bonds between acid and amide than PAA-PAAm gel based on the inter- and intramolecular hydrogen-bonded complexes.

Thermo-sensitive hydrogels are mostly made of PAAm derivatives with hydrophobic groups, because the hydrophobic interaction, which is a driving force for the gel shrinking, can be promoted by increase of the temperature. Glucose-sensitive hydrogels that are made of pH-sensitive polymers have been developed. (Klumb, L. A.; Horbett, T. A., *J. Control. Release,* 27, 95 (1993). Ishihara, K.; Kobayashi, M; Shionohara, I., *Makromol. Chem. Rapid Commun.,* 4, 327 (1983). These articles are incorporated herein by reference.)

To achieve fast responsive-gels, many researchers have explored recently types of hydrogels other than random cross-linked polymers, i.e., graft or block copolymers (Jeong, B.; Bae, Y. H.; Lee, D. S.; Kim, S. W., *Nature,* 388, 860 (1997). This article is incorporated herein by reference.). Compared to random copolymers, researchers found a higher sensitivity in the response of graft copolymers toward varying stimuli. (Hoffman, A. S.; Chen, G. H., *Nature,* 373, 49 (1995). Chen, G.; Hoffman, A. S., *Nature,* 373, 49 (1995). Hassan, C. M.; Doyle III, F. J.; Peppas, N. A., *Macromolecules,* 30, 6166 (1997). These articles are incorporated herein by reference.) A graft copolymer, which has pH-sensitive (acrylic acid) and temperature-sensitive (N-isopropyl acrylamide) components, has developed by Chen and Hoffman. (Chen, G.; Hoffman, A. S., *Nature,* 373, 49 (1995). This article is incorporated herein by reference.) Another graft copolymer, but chemically cross-linked gel, of PMA and poly(ethylene glycol) (PEG) has been developed as a pH-sensitive gel by a research group in Purdue University. (Hassan, C. M.; Doyle III, F. J.; Peppas, N. A., *Macromolecules,* 30, 6166 (1997). Klier, J.; Scranton, A. B.; Peppas, N. A., *Macromolecules,* 23, 4944 (1990). These articles are incorporated herein by reference.)

Given their growing number of important applications, there is a need to develop new hydrogels.

§ 2. SUMMARY OF THE INVENTION

The present invention exploits a cage effect in poly (methacrylic acid) PMA, or in other polyelectrolytes with pH, salt and/or solvent dependent hydrophobic properties with guest radicals produced photochemically to control free radical polymerization. In addition, the invention includes polyelectrolytes with hydrophobic properties that are subject to addition of water miscible solvents to the water solution of the invention. Such solvents could be an alcohol. If alcohol is added to such a water solution, it could act in the same way as increasing the pH and weakening the hydrophobic effect so as to effectively open the cage and release the radicals to cause polymerization of a waiting monomer in the solution. The present invention may therefore use the hydrophobic property of PMA to produce an effective pH-responsive cage for initiating radicals in aqueous solution thereby providing a free radical polymerization that can be controlled by pH, or by adding salt, or solvent to the aqueous solution. The present invention may therefore use addition of certain solvents to water solutions to alter the hydrophobic properties of PMA without substantial change of pH. Salt may also play this role.

In one embodiment of the present invention, a photoinitiator labeled PMA is synthesized with a small proportion of the initiating group (PI-PMA) (See FIG. 2 (e)) to enable a pH-triggered photopolymerization of water soluble monomers. For this strategy, hydrophobic properties of the radical pairs generated from the photoinitiator permit such radical pairs to remain in the cage long enough to recombine before they escape and initiate the polymerization.

The present invention permits the production of, via a pH-gated photopolymerization, a graft copolymer of PMA with PAAm by the polymerization of acrylamide initiated by a photoinitiator appended to PMA. This polymer forms a hydrogel containing a large amount of water for the amount of polymer present. The physically cross-linked network may be formed by inter-chain hydrogen bonding in this system. In place of acrylamide, other water soluble monomers may also be used in this invention for formation of hydrogels. For example, with N,N-dimethylacrylamide and N-isopropylacrylamide may be used. Other hydrogen bonding water soluble monomers, such as $CH_2=CH—COOCH_2CH_2N(CH_3)_2$ and other water soluble free radical polymerizeable monomers as are well known in the art of polymerization, may also be used.

§ 3. BRIEF DESCRIPTION OF THE DRAWINGS

Figure 4:
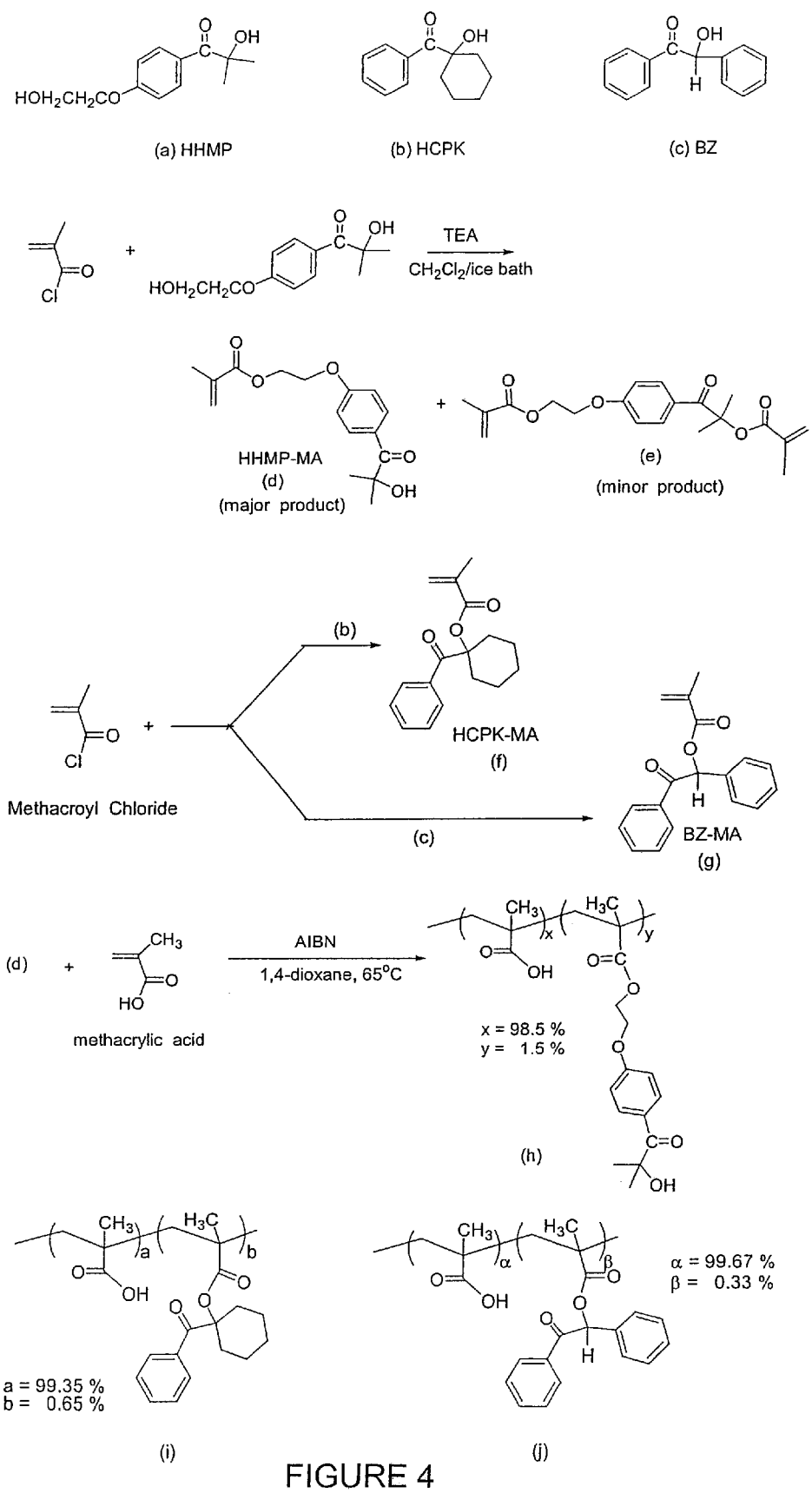

FIG. 4 includes FIG. 4(a) through FIG. 4(j). The structures of the photoinitiators are illustrated in FIGS. 4(a)–4(c). The photoinitiable monomers are illustrated in 4(d) through 4(g). The photoinitiator appended polymers are illustrated in FIGS. 4(h) (HHMP-PMA), 4(i) (HCPK-PMA) and 4(j) (BZ-PMA).

Figure 5:
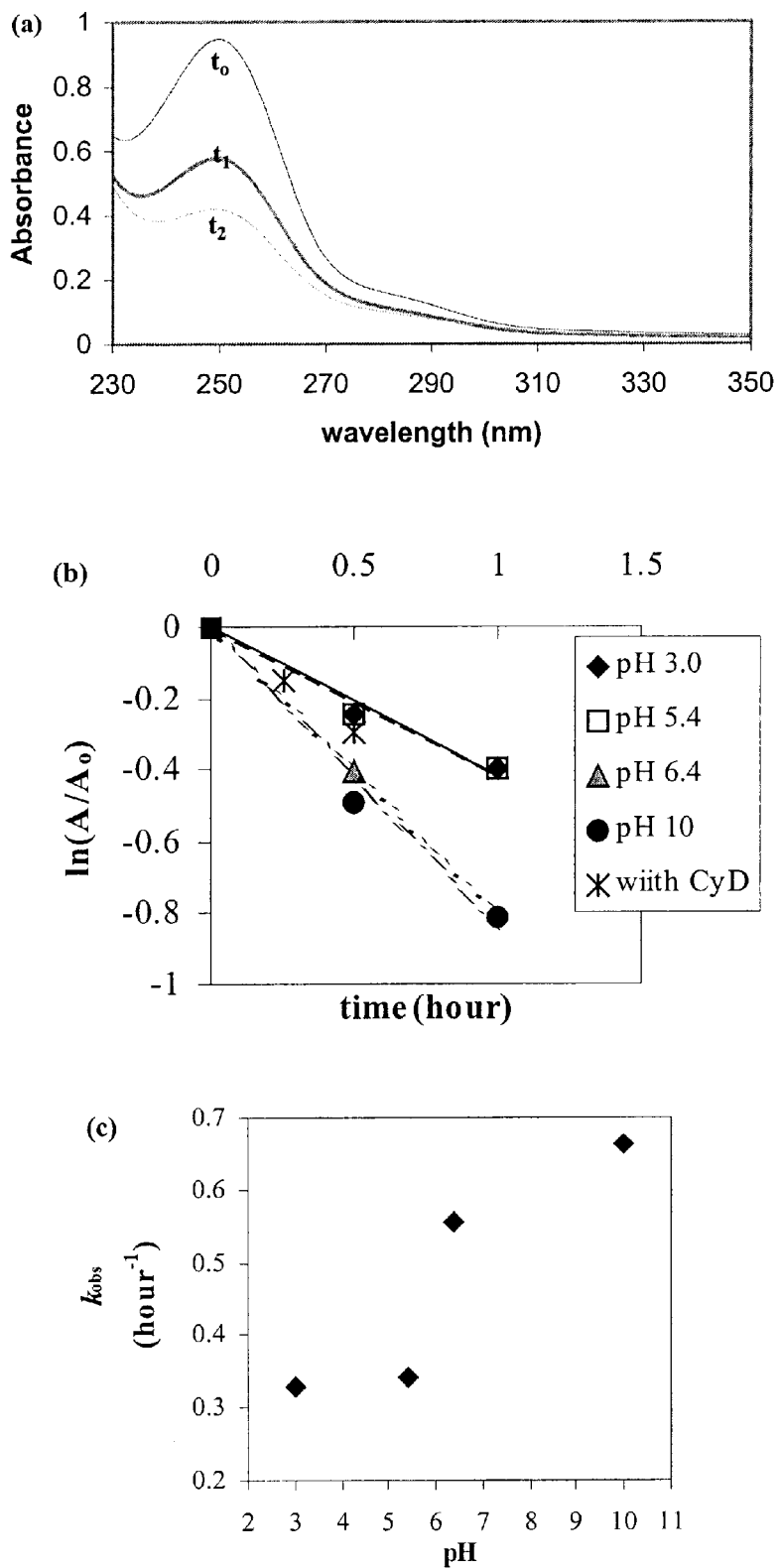

FIGS. 5(a)–5(c) are plots for the fragmentation kinetics of the photoinitiator appended PMA (HCPK-PMA) upon UV irradiation at 365 nm. FIG. 5(a) illustrates the UV spectra of HCPK-PMA upon irradiation (t0: before irradiation, t1: after 30 mm. irradiation, and t2: after 60 mm. irradiation). FIG. 5(b) is the logarithm plot for the kinetics of the bond cleavage at different pHs. FIG. 5(c) illustrates the rate constants obtained from the plots in FIG. 5(b).

Figure 6:
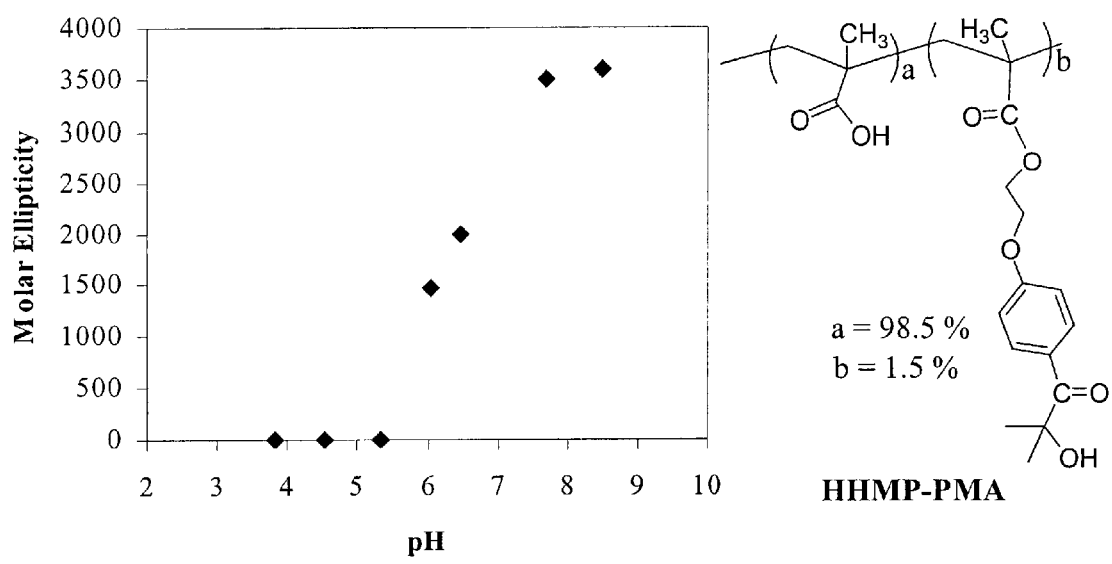

FIG. 6 is an ICD of the HHMP-PMA and β-cyclodextrin complex as a function of pH.

Figure 7:
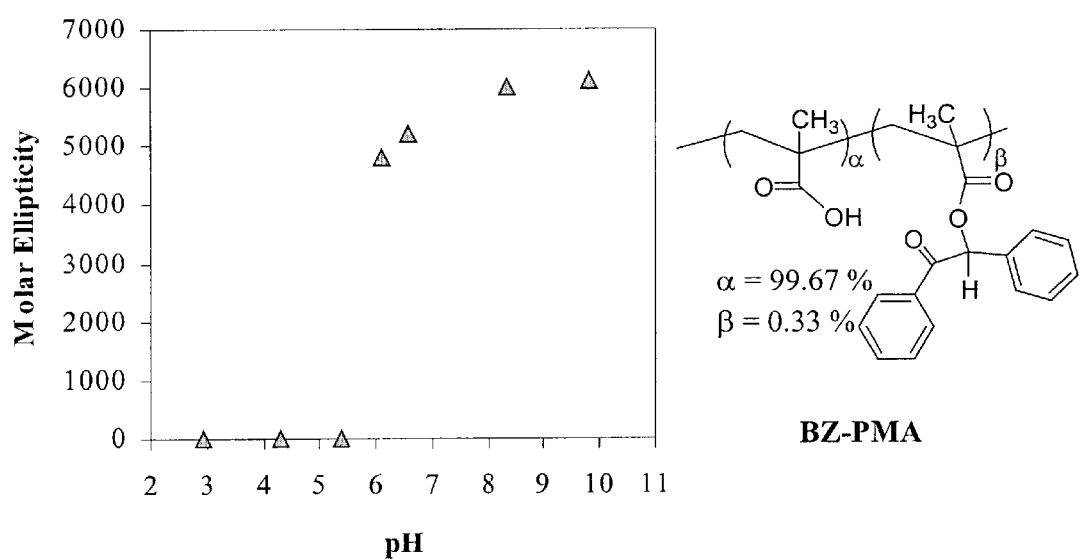

FIG. 7 is an ICD of the benzoin initiator labeled PMA with β-cyclodextrin versus pH.

Figure 8:
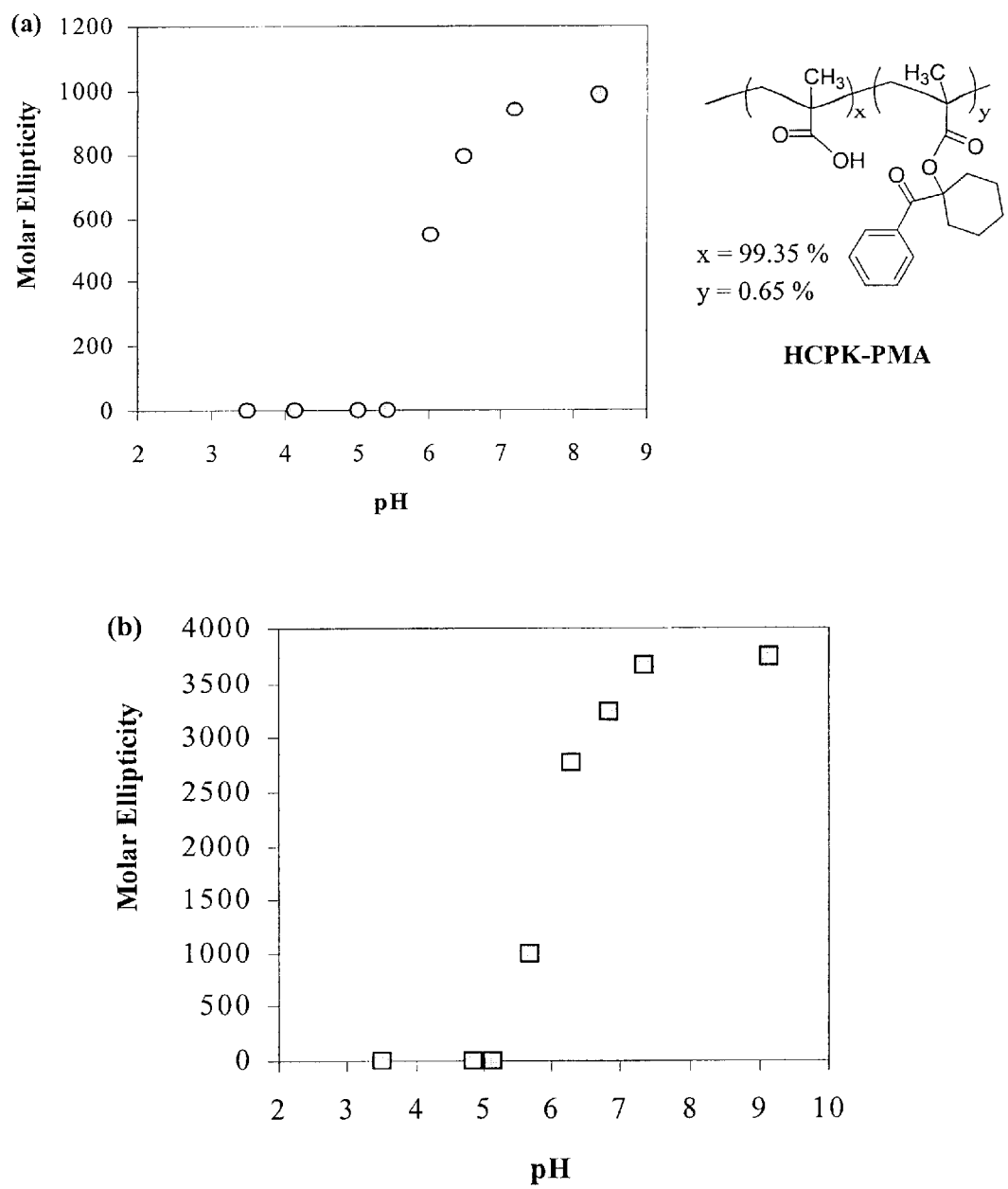

FIG. 8 is an ICD of the HCPK-PMA with β-cyclodextrin in FIG. 8(a) and γ-cyclodextrin in FIG. 8(b), as a function of pH.

Figure 9:
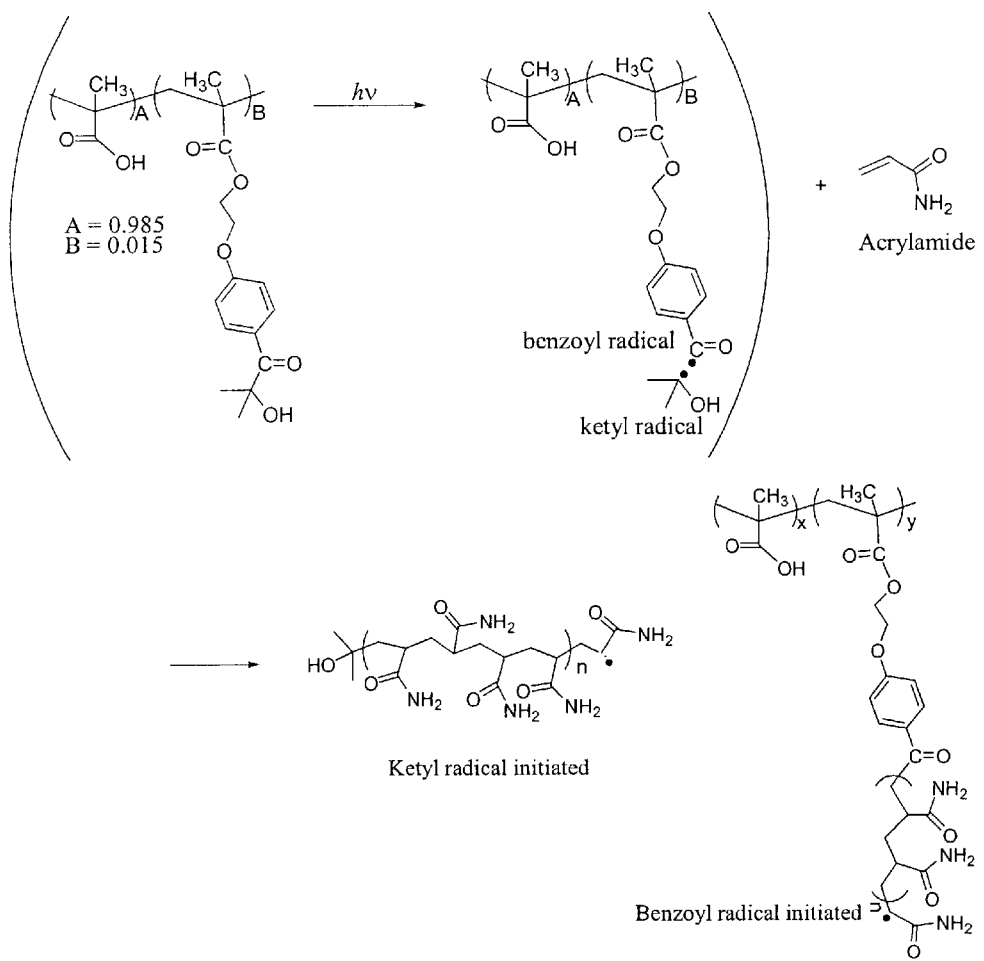

FIG. 9 illustrates the mechanism and the structures of the initiating radicals of the polymerization of acrylamide.

Figure 10:
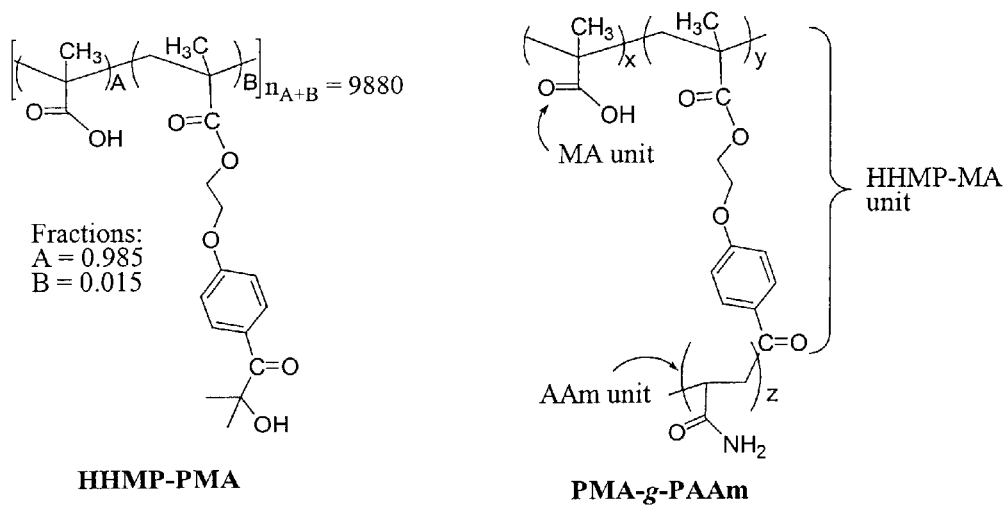

FIG. 10 illustrates the structure of the graft copolymer of PMA and PAAm.

Figure 11:
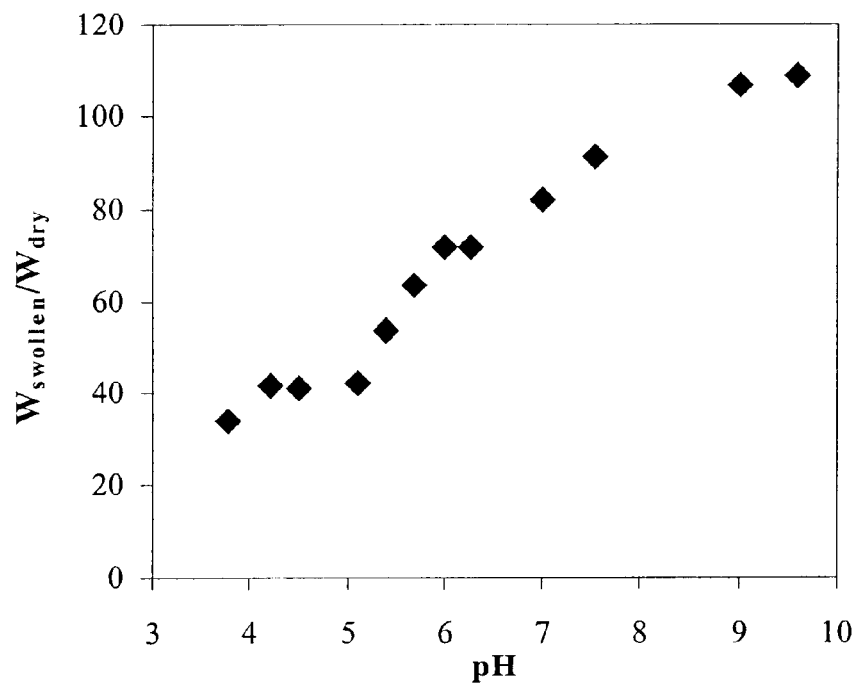

FIG. 11 illustrates the swelling behavior of the polymer obtained by the photopolymerization of acrylamide with HHMP-PMA at pH 9.4.

Figure 12:
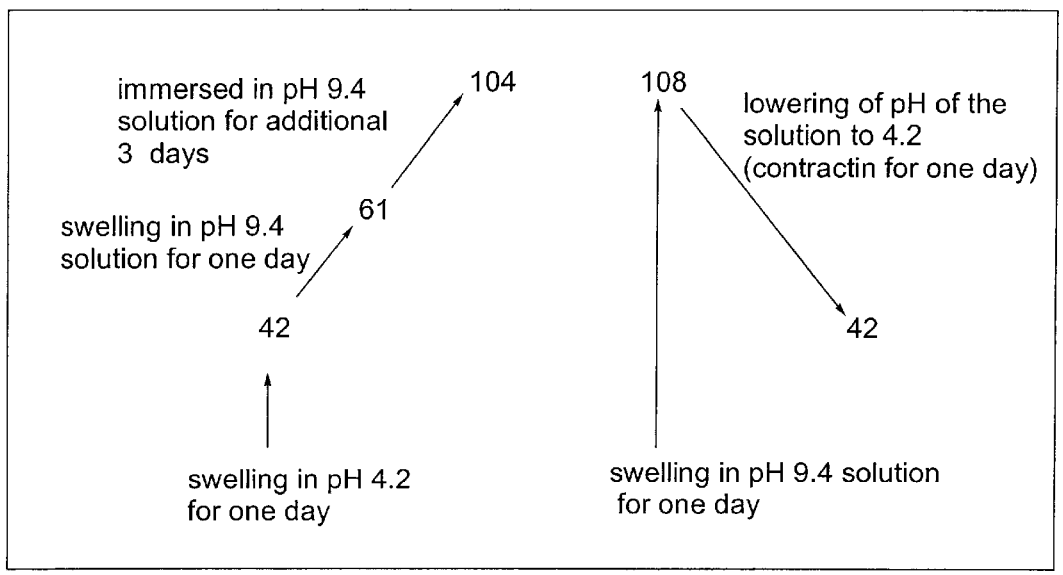

FIG. 12 is a schematic representation of the swelling and contracting behavior of the gel responding to the pH change of the soaking solution (numbers indicate the ratio of the weights of the water-containing polymer and the dried polymer).

Figure 13:
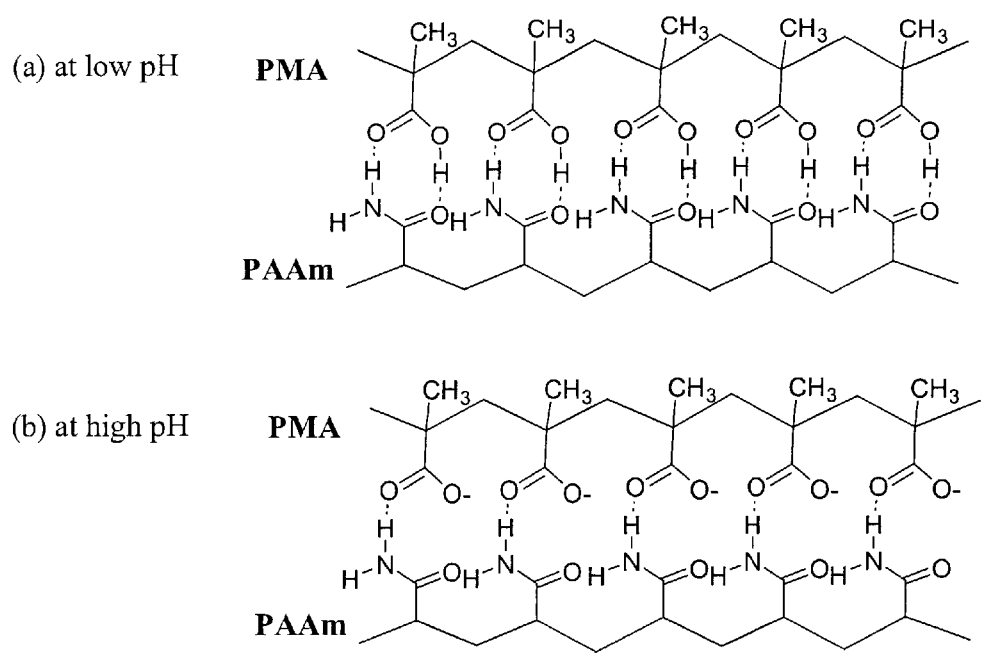

FIG. 13 illustrates hydrogen bonding between PMA and PAAm at low pH in FIG. 13(a) and high pH in FIG. 13(b).

Figure 14:
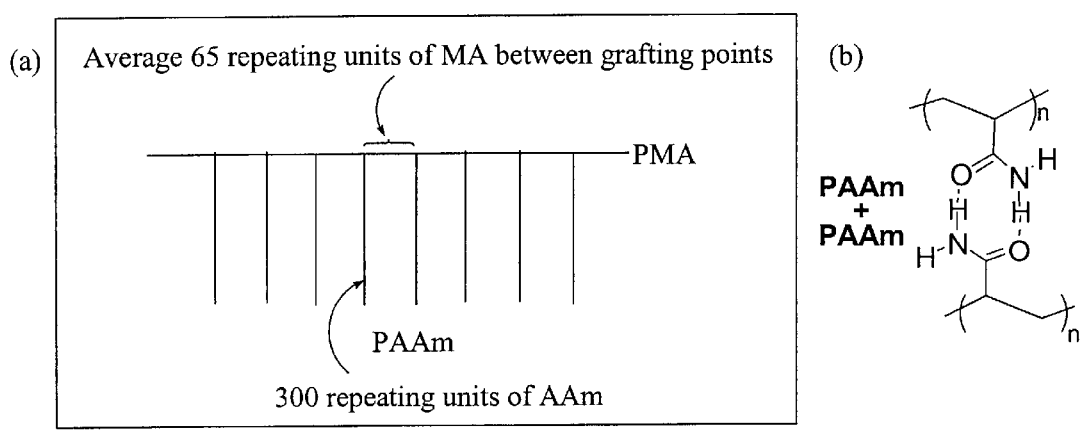

FIG. 14 illustrates a comb-like structure of the graft copolymer of PMA and PAAm synthesized at pH 9.4 in FIG. 14(a) (assuming that all sites react equally), and the graft copolymer's amide—amide hydrogen bonds in FIG. 14(b).

Figure 15:
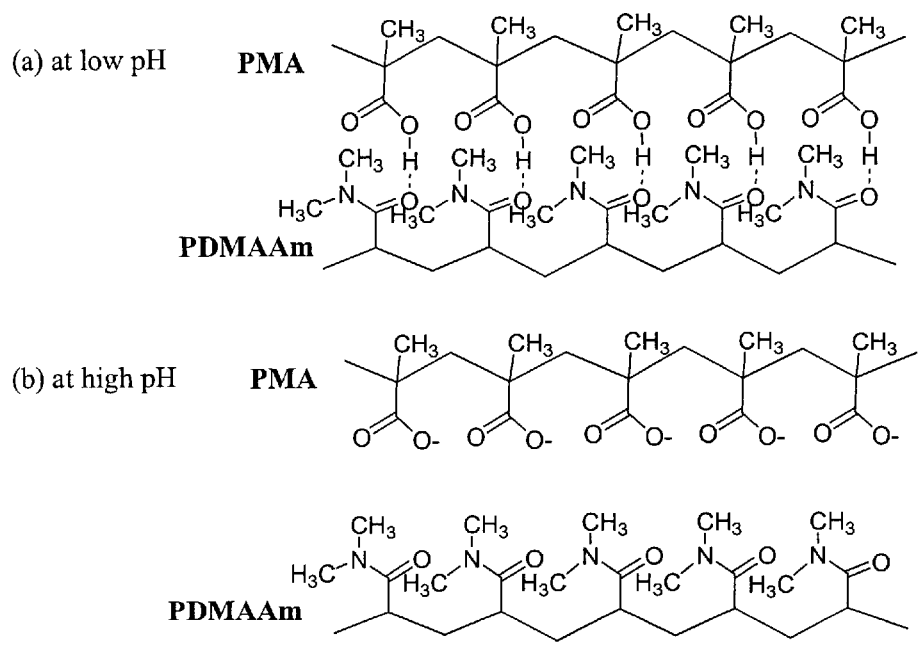

FIG. 15 illustrates a complex formation between poly (methacrylic acid) (PMA) and poly(dimethyl acrylamide) (PDMAAm) by hydrogen bonding.

Figure 16:
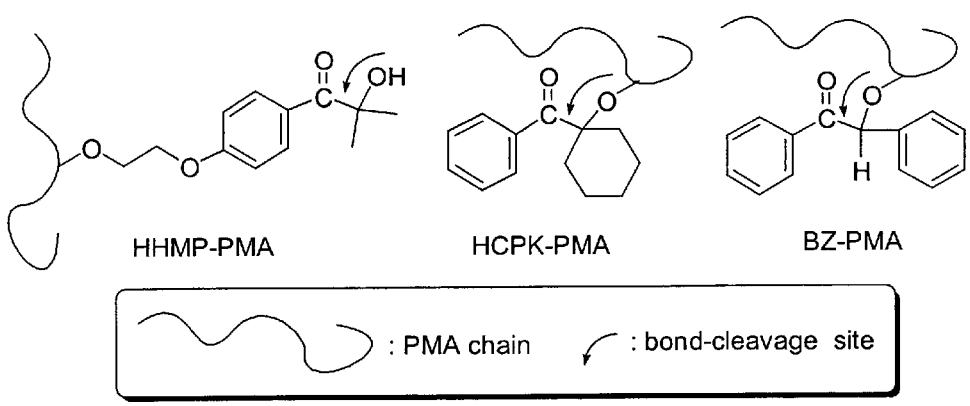

FIG. 16 illustrates the attachment of photoinitiators to PMA by the copolymerization of each monomer with methacrylic acid.

Figure 17:
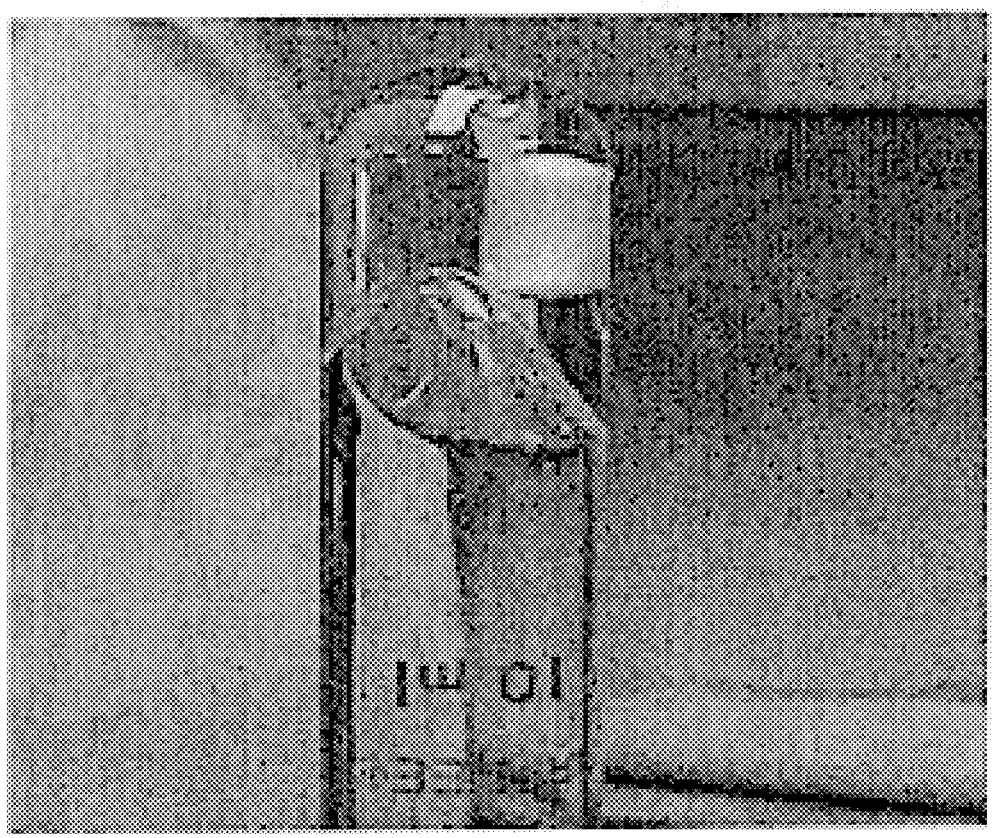

FIG. 17 is a photograph of a gel formed when acrylamide was photopolymerized by HHMP-PMA at a pH such as 6.3, or 9.4.

Figure 18:
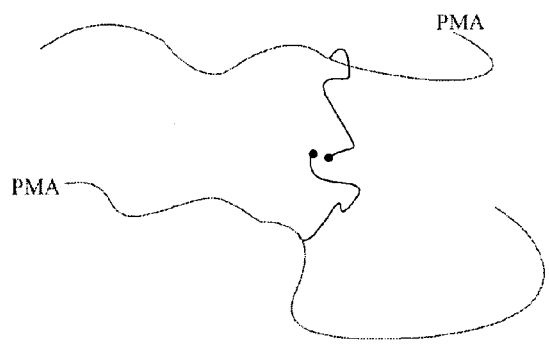

FIG. 18 illustrates gel formation by crosslinking via recombination of two growing grafted chains.

§ 4. DETAILED DESCRIPTION OF THE INVENTION

The present invention involves novel methods and compositions of matter for controlling the initiation of polymerization of monomers in water and for synthesizing new hydrogels. The present invention also involves the new hydrogels. The following description is presented to enable one skilled in the art to make and use the invention, and is provided in the context of particular embodiments and methods. Various modifications to the disclosed embodiments and methods will be apparent to those skilled in the art, and the general principles set forth below may be applied to other embodiments, methods and applications. Thus, the present invention is not intended to be limited to the embodiments and methods shown and the inventors regard their invention as the following disclosed methods, apparatus and materials and any other patentable subject matter to the extent that they are patentable.

§ 4.1 Functions

A first aspect of the present invention may function to provide a pH-responsive cage in water with guest radical pairs. The radical pairs may be used to initiate a polymerization of water-soluble reactive monomers. The radical pairs may be formed by photoinitiation. Methods and compositions of matter related to this first aspect of the invention are described in § 4.2 below.

A second aspect of the present invention may function to provide hydrogels produced in accordance with the first aspect of the present invention. Methods and compositions of matter related to this second aspect of the invention are described in § 4.3 below.

§ 4.2 Cage With a pH Release-Trigger Hosting Guest Radicals

§ 4.2.1 Basic Components and Properties

Certain water-soluble monomers form a polymer in the presence of radicals. Photoinitiator radical pairs, for polymerizing water-soluble monomers in an aqueous solution, are guests to a pH responsive host cage.

Figure 1:
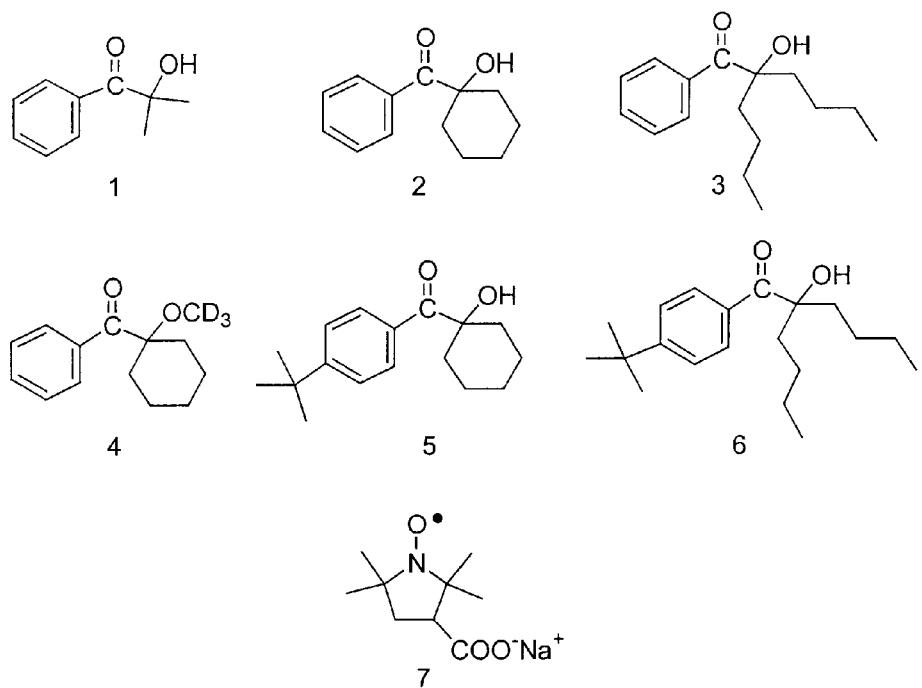
FIG. 1 illustrates structures of ketones and scavenger of the cage effects reported in the literature.
Figure 2:
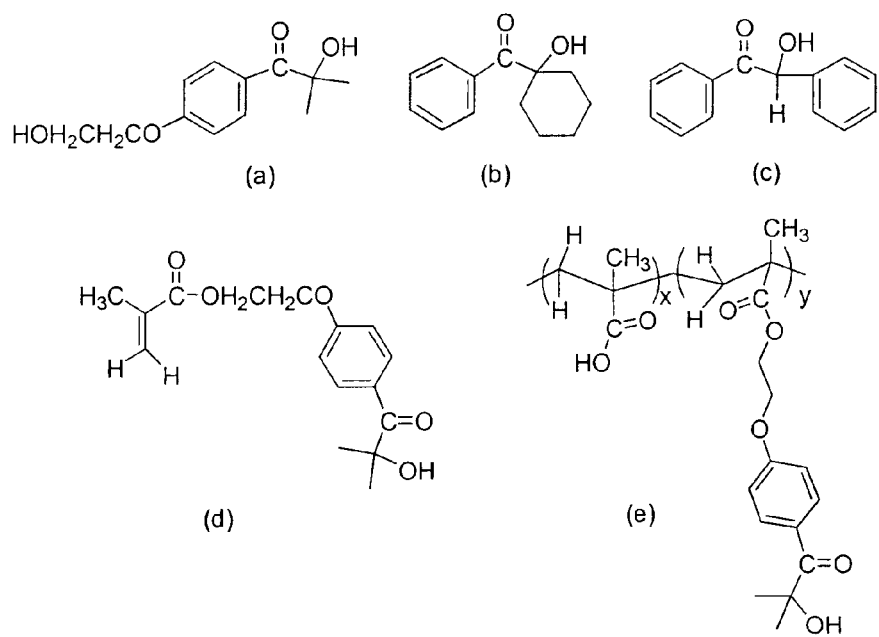
FIG. 2 illustrates structures of the photoinitiators and photoinitiable polymer (PI-PMA).

Solubility in water can be achieved by linking ionic groups to conventional oil soluble photoinitiators, for instance, benzophenone, benzil and thioxanthone. In a recent study, photopolymerization of acrylamide in water has been investigated in the presence of water-soluble hydroxyalkylphenones (FIG. 2a)). The hydroxyethoxy group at the para position of a phenyl ring in a photoinitiation could be used to link such a group to a poly(carboxylic acid) (FIG. 2d)). In the work to follow this was accomplished and with two other initiators (b and c) the esterification took also place through the tert-hydroxy group to carboxylic group of the PMA.

§ 4.2.2 Exemplary Structures and Their Production

PMA chains, as a function of pH, form capsules around hydrophobic groups. See, S. Y. Yang, G. Schultz, M. M. Green, H. Morawetz, "The Clustering of Poly(methacrylic acid) around Appended Binaphthyl Labels as Reflected by the Disruption of γ-Cyclodextrin Complexation and Racemization Kinetics", *Macromolecules*, 32, 2577 (1999). This article is incorporated herein by reference.

If the hydrophobic group is a photoinitiator of polymerization and if the PMA capsule is sufficiently stable to keep the photochemically generated radical pairs from the potentially reactive monomers, the radial pairs would recombine or participate in some transfer reaction rather than initiating the polymerization. This effect, a so-called "cage effect", has been studied for a long time, from the case of solvent cages (Tanner, D. D.; Meintzer, C. P.; Tsai, E. C.; Oumar-Mahamat, H., *J. Am. Chem. Soc.*, 112, 7369 (1990). This article is incorporated herein by reference.) to the "super cage effect" on radical polymerizations (Bosch, P.; Mateo, J. L.; Serrano, J., *J. Photochem. Photobiol. A*, 103, 177 (1997). This article is incorporated herein by reference.) including emulsion polymerizations (Encinas, M. V.; Lissi, E. A., *J. Polym. Sci. Polym. Chem. Ed.*, 2157 (1983). Torii, H.; Fujimoto, K.; Kawaguchi, H., *J. Polym. Sci. Part A Polym Chem.*, 34, 1237 (1996). These articles are incorporated herein by reference.), photochemical degradation of polymers (Male, J. L.; Yoon, M. G.; Glenn, A. G.; R., W. T. J.; Tyler, D. R., *Macromolecules*, 32, 3898 (1999). This article is incorporated herein by reference.) and cyclodextrin host-guest chemistry. (Rao, B. N.; Turro, N. J.; Ramamurthy, V., *J. Org. Chem.*, 51, 460 (1986). This article is incorporated herein by reference.) However, the inventors believe that a photopolymerization triggered by a cage that opens and closes as a function of change in pH in water, or as a function of salt concentration, or as a function of the concentration of solvents to the aqueous solution has not appeared in the literature. The inventors designed a system to test the effect of the PMA ability to form hydrophobic stimulated cages on the photopolymerization of some water-soluble monomers.

While PMA is preferred for use as the cage for this invention, it is not unique in its ability to form cages about hydrophobic groups. For example poly(vinyl pyrrolidone) also shows this property and as well certain polymers designated as polysoaps. Other polymers with this property are known, and include, for example, $CH_2=C(C_2H_5)-COOH$. Therefore, the present invention is not restricted to PMA. Further, the invention is not restricted to the photoiniatiators shown here since it can easily be recognized in the art that a wide variety of photoinitiators forming radicals on irradiation or causing radicals to form via interaction with other molecules fit into the general description of the photoinitiators described. The photoinitiator is preferably capable of forming a covalent bond to the polyelectrolyte, which can be PMA or other polyelectrolytes, as noted above. In addition, for the purposes of this invention, photoinitiators may be synthesized allowing their attachment to the chain and with groups that alter their hydrophobicity as is well known in the art of photochemistry and organic chemistry.

§4.2.2.1 Synthesizing Photoinitiable PMAs and Control Experiments

The inventors designed poly(methacrylic acid)s ("PMAs") that contain photoinitiator groups in the side chain. Photoinitiators are usually divided according to the reaction mechanism into two classes—so called Type I and Type II photoinitiators. Upon irradiation, the Type I photoinitiators undergo fragmentation to yield initiating radicals. Type II photoinitiators do not fragment upon irradiation; rather they need to react with other molecules to generate the radicals. This post-fragmentation reaction usually occurs via either a hydrogen abstraction by the excited initiator or a photoinduced electron transfer followed by fragmentation. Those skilled in the art of polymerization and cage effects will easily recognize that Type II photoinitiators can also be used in this invention although the invention is demonstrated with Type I effects.

Figure 3:
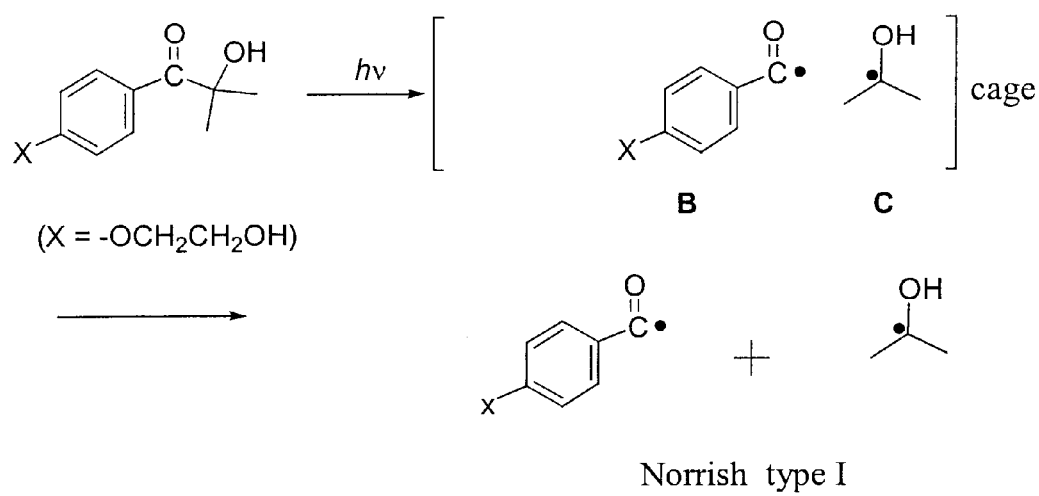
FIG. 3 illustrates the fragmentation mechanism of a photoinitiator.

In a first embodiment, Type I photoinitiators were used with the PMA cluster as a radical cage. Most Type I photoinitiators contain a carbonyl group substituted with an aromatic group and a tertiary alkyl group. The alkyl group is often substituted with an electron withdrawing group assisting the photofragmentation. FIG. 3 shows the fragmentation mechanism of the photoinitiator in one embodiment of the invention.

Depending on the nature of the substituent group, the fragmentation can occur at a bond adjacent to the carbonyl group (α-cleavage), or at a β-position to the aromatic carbonyl (β-cleavage). The most usual fragmentation of the photoinitiator is α-cleavage and the benzoyl radicals that are formed by α-cleavage are known to be sufficiently reactive to induce polymerization in vinyl monomers. When the fragmentation in the photoinitiator takes place at the α-position, as shown in FIG. 3, it is called a Norrish type I reaction.

FIG. 4 shows the structures of the photoinitiators and the synthetic method used in this embodiment. The photoinitiators (FIGS. 4a)-(c)) have reactive hydroxyl groups, which can react with methacryloyl chloride to form the photoinitiable monomers. 2-Hydroxy-4'-(2-hydroxyethoxy)-2-methyl propiophenone ("HHMP") of FIG. 4a) has two reactive hydroxyl groups: a primary hydroxyl group and an α-hydroxyl group. 1-Hydroxy cyclohexyl phenyl ketone ("HCPK") of FIG. 4b) and benzoin ("BZ") of FIG. 4(c) have only an α-hydroxyl group adjacent to the benzoyl group in which the bond cleavage occurs. The esterification of the primary hydroxy group in HHMP does not change the reactivity of the fragmentation of the photoinitiator. However, it is expected that the reactivity of the bond cleavage in HCPK and BZ will decrease when appended to the polymer. After the reaction of HHMP with methacryloyl chloride, the product (monomer of FIG. 4d)) could be easily isolated from a mixture with the minor product of FIG. 4(e) by column chromatography. Photoinitiable polymers were obtained by copolymerization of the photoinitiable monomers of FIGS. 4(f) and 4(g) with methacrylic acid monomer initiated by AIBN in 1,4-dioxane at 65° C. At this temperature, the photoinitiator was stable and the labeling percentage could be easily varied. The polymer was dissolved in methanol and purified by precipitation in acetone or diethyl ether. The other two photoinitiators, HCPK and BZ, were also attached to PMA using the same method as for the HHMP.

The labeling percentages of the photoinitiators were determined by UV spectroscopy based on the extinction coefficients of the free photoinitiators in methanol. Table 1 contains the extinction coefficients and the maximum wavelengths for the UV absorption spectra of each photoinitiator.

TABLE 1

UV absorption peaks of the photoinitiators

| Sample | Solvent | extinction coefficient ($\epsilon$) | $\lambda_{max}$ |
| --- | --- | --- | --- |
| HHMP | Water | 13000 | 278 |
| HCPK | Methanol | 800 | 280 |
| BZ | Methanol | 22500 | 250 |

The molecular weights of the photoinitiator-appended PMAs were measured by GPC of their methyl esters, which were synthesized from the corresponding PMA by exhaustive methylation by the well known DBU method, using PMMA standards. The molecular weight characteristics of the photoinitiator-labeled PMAs (PI-PMAs) are listed in Table 2.

TABLE 2

The molecular weights and labeling fractions of PI-PMA samples.

| Sample | $M_w$ | $M_w/M_n$ | PI labeling percentage |
| --- | --- | --- | --- |
| HHMP-PMA | 850,000 | 1.68 | 1.5 mol % |
| HCPK-PMA | 740,000 | 1.49 | 0.65 mol % |
| BZ-PMA | 780,000 | 1.5 | 0.33 mol % |

§4.2.2.2 Control Experiment: The Unbound Photoinitiator: Spectroscopic Study and Photoinitiation of Acrylamide at Different pHs It is desirable to study the behavior of the photoinitiator in water, both alone and in the presence of PMA, before further study of the photoinitiator bound to the polymer. However, to be used in such a study, the photoinitiator should be soluble in water. Among the photoinitiators attached to the PMA in accordance with the present invention, HHMP (See FIG. 2.) has good solubility in water because of the para-(hydroxyethoxy) group on the benzene ring. Other photoinitiators may be too hydrophobic to be soluble in water. Therefore, the HHMP initiator is one photoinitiator that the inventors studied in the unbound state. As will be discussed below, the fluorescence of the unbound HHMP, and its complexation with cyclodextrin has also been studied by the inventors.

The inventors also studied the initiation of the acrylamide polymerization by HHMP in the presence of PMA (unbound to the polymer). Chain characteristics for PMA with respect to hydrophobic moieties similar to those reported in the literature were expected. The aromatic residue of the photoinitiator, therefore, should be adsorbed to the PMA at low pH, as reported for other aromatics (Barone, G.; Crescenzi, V.; Liquori, A. M.; Quadrifoglio, F., *J. Phys. Chem.*, 71, 2341 (1967). Barone, G.; Crescenzi, V.; Pispisa, B.; Quadrifoglio, F., *J. Macomol. Chem.*, 1, 761 (1966). Moncellet-Sauvage, J.; Moncellet, M.; Loucheuz, C., *Makromol. Chem.*, 183, 839 (1982). These articles are incorporated herein by reference.) whose solubility in water is enhanced in the presence of PMA.

§4.2.2.2.1 Control Experiment: Fluorescence of the Unbound HHMP

The HHMP photoinitiator ($6.1 \times 10^{-4}$ M) was dissolved in aqueous 0.01M PMA. The fluorescence spectrum of the solution was measured at varying pH. The results showed the effect of the cluster formation of PMA around the aromatic photoinitiator on the emission intensity even when the initiator is not covalently attached to the PMA. The fluorescence spectra were obtained from the aqueous solution of the HHMP photoinitiator without PMA and compared with the spectra obtained from the photoinitiator in the presence of PMA. The emission intensity of the photoinitiator that was adsorbed on the PMA, at low pH, was increased on lowering the pH, whereas the emission intensity of the photoinitiator without PMA was decreased with lowering of the pH.

A transition behavior, that is, a steep change in property at near to pH 5.5, in the fluorescence intensity of the unbound HHMP was observed in the PMA solution as a function of pH. This transition was also observed in the cyclodextrin complexation with the photoinitiator labeled PMA, which will be discussed below and both effects arise from the opening and closing of the cage around this pH.

§4.2.2.2.2 Control Experiment: Cyclodextrin Complexation With the HHMP Unbound to PMA The circular dichroism of the photoinitiator in the presence of the cyclodextrin was measured with and without the PMA solution. $\alpha$-, $\beta$- or $\gamma$-Cyclodextrins were used. HHMP forms a complex only with $\beta$-cyclodextrin, which is demonstrated by an induced circular dichroism (ICD) from 320 nm to 210 nm. Complexation with $\alpha$- or $\gamma$-cyclodextrin could not be detected. The ICD of the complex did not change with varying pH. However, the ICD produced by the complexation of the aromatic photoinitiator HHMP with $\beta$-cyclodextrin was also observed at all pH's even in the presence of PMA.

Therefore, in spite of the pH dependence of the fluorescence intensity of the aromatic photoinitiator in the presence of the PMA, the cyclodextrin complexation results indicate that the HHMP adsorbed in the PMA at low pH, as evidenced by the fluorescence data, still can interact with cyclodextrin. This observation demonstrates that the invention will work when the photoinitiator is covalently bound to the polyelectrolyte capable of the cage effect, as for example PMA.

In the absence of the cyclodextrin, the aromatic photoinitiator HHMP can be adsorbed in the PMA cluster at low pH as evidenced by the enhanced fluorescence. However, when the cyclodextrin is present in the solution, the HHMP molecules may diffuse out of the PMA cluster and complex with the cyclodextrin. This may indicate that the HHMP is more stable in a complex with the cyclodextrin than in the PMA cluster. If the aromatic chromophore that was absorbed in the PMA has very poor solubility in water, the barrier of the route to the cyclodextrin through the water phase may be too high at any pH.

§ 4.2.2.2.3 Control Experiment: Photoinitiation by Unbound HHMP in the Presence of PMA on the Polymerization of Acrylamide In this embodiment, the inventors chose acrylamide (AAm) as a water-soluble monomer because polyacrylamide is soluble in water, independent of pH. Furthermore, polyacrylamide (PAAm) can be isolated from a mixture with PMA by precipitation into methanol, which is a good solvent for PMA.

As a control experiment, the photoinitiation of acrylamide by free HHMP at different pH's was studied and no detectable change in polymer yield was found. The effect of the PMA on the photoinitiation of the acrylamide was then studied. The same experiment in the presence of PMA led to similar results, although a small difference was observed between the polymerization tubes at low and high pH's. Below pH 4, turbidity was observed after 10 minutes of irradiation. This might have arisen by a phase separation, which is known to be caused by the complexation between PMA and PAAm. (Silberberg, A.; Eliassaf, J.; Katchalsky, A., *J. Polym. Sci.,* 23, 259 (1957). Katono, B.; Maruyama, A.; Sanui, K.; Ogata, N.; Okano, T.; Sakurai, Y., *J. Contolled Release,* 16, 215 (1991). Wang, Y.; Morawetz, H., *Macromolecules,* 22, 164 (1989). These articles are incorporated herein by reference.) However, the yield of the PAAm was not affected significantly by this precipitation, showing that the free photoinitiators are equally reactive at different pH's, regardless of the conformational change of PMA.

§ 4.2.2.3 Photoinitiator Covalently Appended to PMA

The results of the study of the free photoinitiator were described above and demonstrate that the invention works when a covalent bond between the photoinitiator moiety and the polyelectrolyte exists. As described below, this also leads to the formation of graft copolymers with hydrogel and other potentially useful properties. In the embodiments discussed below, three aromatic photoinitiators were chosen as pendent molecules for the PMA. All photoinitiators in this embodiment have hydrophobic character and have a Norrish type I cleavage mechanism for the fragmentation. They were attached to the PMA by the copolymerization of each monomer with methacrylic acid as shown in FIG. 4.

§ 4.2.2.3.1 The Effect of the pH-Dependent PMA Conformation on the PMA Appended Photoinitiator Initiated Polymerization Most of the radical pairing kinetic studies of fragmented radicals upon irradiation have been carried out by laser flash photolysis with monitoring by electron spin resonance (ESR). (Wu, C. -H.; Jenks, W. S.; Koptyug, I. V.; Ghatlia, N. D.; Lipson, M.; Tarasov, V. F.; Turro, N. J., *J. Am. Chem. Soc.,* 115, 9583 (1993). Eichler, J.; Herz, C. P.; Naito, I.; Schnabel, W., *J. Photochem.,* 12, 225 (1980). Vacek, K.; Geimer, J.; Beckert, D.; Mehnert, R., *J. Chem. Soc. Perkin Trans.,* 2, 2469 (1999). These articles are incorporated herein by reference.) Irradiation events were followed using the UV absorption spectroscopy.

When the chromophores are fragmented, basically, their absorption spectra will change. If the radical pair recombines forming the original molecule, the UV absorption spectra will be maintained. This recombination reaction will reduce the radicals available to initiate polymerization or to decompose in other ways. Thus, in the absence of monomer molecules, the more frequently the recombination occurs, the slower the overall conversion to decomposition products will be. Therefore, the inventors studied the kinetics of the decay in the UV absorption maximum at different pH's to gather information on the clustering effect of PMA. To measure the decay rate of the UV absorption of the photoinitiator, the UV spectrum of the solution was measured before and after each irradiation.

Decay of the absorption band of HHMP ($\lambda_{max}$~278 nm) in the HHMP labeled PMA (HHMP-PMA) was too fast to be followed at all pH's upon irradiation by a medium pressure mercury lamp with a maximum wavelength at 365 nm. In the case of the benzoin labeled PMA (BZ-PMA), the decay rate at first was fast (30 minutes), slowing down after further irradiation.

The UV decay rate of HCPK-PMA was slow compared to the other systems and therefore the kinetics of the UV decay could be followed more precisely. As illustrated in FIG. 5(a), the intensity of the UV absorption of the HCPK-PMA at all pH's studied decreased without any spectral shift or change of shape in the range of the original UV absorption wavelength, showing that the original structure of the initiator mainly contributes to the spectra. A recombination process, if it occurs, will reduce the decay rate of UV absorption in this wavelength range while decomposition must produce molecules without or with UV absorption in this wavelength range. The results of these kinetic measurements are shown in FIG. 5(b), where the logarithm of the ratio of the UV absorbance after and before irradiation was plotted versus time as a function of pH. The absorption decay showed pseudo-first-order kinetics and the rate constants ($k_{obs}$) were obtained from the slopes of the first order plots shown in FIG. 5(b).

In FIG. 5(c), the dependence of the decay rate on the pH is shown. Compared to the decay rate at high pH, the rates become slow at low pH where the PMA is known to form a cluster around the label. At pH's below 6, the UV absorbance of the pendent photoinitiator decreases to about 50% compared to the value at high pH. This clearly shows a transition corresponding to the transition from the cluster to the extended chain conformation of the PMA. This was also observed in the pH dependent complexation of HCPK-PMA with cyclodextrin as discussed below. When the polymer solution (HCPK-PMA) was irradiated in the presence of γ-cyclodextrin at high pH, where the photoinitiating pendent is complexed with cyclodextrin, a slower cleavage rate was observed in the absence of the cyclodextrin (data are marked as CyD in the FIG. 5(b)) demonstrating the cage effect of the cyclodextrin. (Rao, B. N.; Syamala, M. S.; Turro, N. J.; Ramamurthy, V., *J. Org. Chem.,* 52, 5517 (1987). This article is incorporated herein by reference.) No cage effect of the cyclodextrin was observed in the case of HHMP-PMA upon irradiation at high pH. Although β-cyclodextrin formed a complex with the pendent initiator HHMP at high pH, revealed by the induced circular dichroism (to be discussed in the following section), cyclodextrin was not effective in protecting the photoinitiator from bond cleavage leading to decomposition. Consequently, the inventors believe that because the HHMP pendent group has a long spacer (ethoxyhydroxy group) between it and the polymer backbone, the cyclodextrin may be able to move along the spacer. (Harada, A.; Kamachi, M., *Macromolecules,* 23, 2821 (1990). This article is incorporated herein by reference.), and therefore the cyclodextrin complex may not provide a tight enough fit for the cage effect.

§ 4.2.2.3.2 pH Dependent Complexation of Cyclodextrin With a PMA-Covalently Appended Initiator The cyclodextrin complexations with aromatic photoinitiators appended to PMA were measured at various pH. FIG. 6 shows the circular dichroism, which was induced by complexation with β-cyclodextrin, of the HHMP appended to the PMA as a function of pH.

No signal was observed at a pH below 6. However, when the pH of the solution is higher than about 6, the ICD signal increased sharply. This signal can be reversibly turned on and off by change of the pH around the critical transition pH. This differs from the interaction of the unbound HHMP with cyclodextrin.

Based on the results of the fluorescence of the HHMP in the presence of PMA, the inventors believe that the HHMP was adsorbed in the PMA at low pH and protected from contact of water. However, the HHMP adsorbed in the PMA at low pH could still interact with the cyclodextrin, which was revealed by the ICD signal at low pH. In the covalently bound system of the HHMP, the results of the cyclodextrin experiment suggest that the HHMP labels have a much stronger interaction with the PMA cluster than when it is not covalently attached to the PMA.

Similar to the HHMP-PMA, the benzoin-labeled PMA (BZ-PMA) forms a complex only with β-cyclodextrin. An induced circular dichroism spectrum of the complex between the BZ labels and β-cyclodextrin shows a peak with maximum around 250 nm. Because of the high extinction coefficient compared to the other photoinitiators at UV absorption peak in the range of 350–220 nm, the complex of the BZ label and cyclodextrin exhibits the highest ICD value. FIG. 7 shows the induced circular dichroism of the BZ-PMA plotted versus pH. It shows a very sharp transition within several tenths of a pH unit.

FIGS. 8(a) and 8(b) exhibit the ICD of the HCPK-PMA with cyclodextrins as a function of pH. The HCPK labels can complex with either β- or γ-cyclodextrin, which differs from the properties of the other initiators (HHMP and BZ).

The γ-cyclodextrin complex with the HCPK label gave a larger signal than the β-cyclodextrin. In both cases, a typical sharp transition of the ICD was observed at pH near 6. This transition pH is similar to the transition observed in the UV irradiation experiment, which was discussed in the previous section. As before, the reversible complexation with the cyclodextrin predicts the pH dependent cage effect in the absence of the cyclodextrin and on exposure to light to form the radicals. This cage effect could also be affected by changing salt concentration, and/or by adding or removing water miscible solvents, such as alcohols for example. The basis for this can be found in the article: S. Y. Yang, G. Schultz, M. M. Green, H. Morawetz, "The Clustering of Poly(methacrylic acid) around Appended Binaphthyl Labels as Reflected by the Disruption of γ-Cyclodextrin Complexation and Racemization Kinetics", *Macromolecules*, 32, 2577 (1999). This article is incorporated by reference.

§ 4.2.2.4 Synthesis of Photoinitiator Covalently Appended to PMA

Photoinitiable polymers were prepared by copolymerization of photoinitiable monomers with methacrylic acid with AIBN in 1,4-dioxane at 65° C. Photoinitiable monomers were synthesized by esterification of photoinitiators with methacroylyl chloride in distilled methylene chloride at room temperature. Photoinitiators, 2-hydroxy-4'-(2-hydroxyethoxy)-2-methyl propiophenone (HHMP), 1-hydroxy cyclohexyl phenyl ketone (HCPK), and benzoin (BZ) were purchased from Aldrich and used with no further purification. Methacryloyl chloride (b.p. 96° C.) and methacrylic acid (b.p. 163° C.) monomers were distilled. 1,4-Dioxane was freshly distilled over lithium aluminum hydride (LiAlH$_4$).

§ 4.2.2.4.1 2-hydroxy-4'-(2-hydroxyethoxy)-2-methyl Propiophenone (HHMP) Covalently Appended to PMA To a flame dried two-neck round bottomed flask (50 ml) placed in ice/salt bath and equipped with a magnetic stir bar, adaptor (14/24) and rubber septum (14/24) purging with argon gas, a solution of 2-hydroxy-4'-(2-hydroxyethoxy)-2-methyl propiophenone (HHMP) (0.9 g, 4 mmol) dissolved in dried CH$_2$Cl$_2$ (10 ml) was added. Then, triethylamine (0.9 ml, 6.45 ml) were added into the mixture followed by addition of methacroyl chloride (0.63 ml, 0.45 mmol) with stirring. TLC showed two spots with R$_f$ values of 0.6 (major spot) and 0.8 (minor spot) in hexane/ethyl acetate mixture (3:1 v/v). After 6 hours, the reaction mixture was treated by 2.0 M NaHCO$_3$ aqueous solution, extracted with CH$_2$Cl$_2$ (4×10 ml). The solution was dried by anhydrous Mg$_2$SO$_4$ with stirring. After Mg$_2$SO$_4$ was filtered out, solvent was removed by rotary evaporator to give crude product. Two compounds in the crude mixture were separated by flash column chromatography (hexane/ethyl acetate=5:1 v/v). These compounds were identified by 1H-NMR Spectroscopy. Major product was the ester of methacryloyl chloride (MC) and HHMP (photoinitiator), (HHMP-MA), and minor product was diester of MC and HHMP. HHMP-MA: $^1$H-NMR: δ1.6 (s, 6H), 1.91 (s, 3H), 4.2 (s, 1H α-OH), 4.24 (t, 2H), 4.51 (t, 2H), 5.58-6.15 (d, 2H), 6.9 (d, 2H), 8.05 (d, 2H).

This monomer, HHMP-MA, was copolymerized with methacrylic acid, initiated by AIBN. HHMP-MA (0.596 g, 0.2 mmol) and methacrylic acid (0.85 ml, 10 mmol) was dissolved in 1,4-dioxane (3 ml) and then AIBN (0.8 mg) was added. The mixture was degassed by purging with argon and sealed under vacuum. Then, the reaction tube was placed in an oil bath at 65° C. with stirring for 3 hours. The polymer was purified by precipitation into diethyl ether (500 ml) and dried under vacuum overnight, resulting in a 60% yield. The proportion of the HHMP initiator was determined by measuring UV absorption using the extinction coefficient of free HHMP molecule in methanol.

§ 4.2.2.4.2 1-Hydroxy Cyclohexyl Phenyl Ketone (HCPK) Covalently Appended to PMA 1-Hydroxy cyclohexyl phenyl ketone (HCPK) appended monomer was synthesized by the method as described above. HCPK (0.82 g, 4.0 mmol) was reacted with methacryloyl chloride (0.63 ml, 6.45 mmol) and triethylamine (0.9 ml, 6.45 mmol) in 10 ml of dried CH$_2$Cl$_2$ at room temperature. The product was purified by flash column chromatography. $^1$H-NMR for HCPK-MA (monomer): δ1.8 (m, 13H) 2.15 (d, 2H), 5.60-6.14 (d, 2H) 7.17-7.38 (m, 3H), 7.93 (d, 2H).

1-Hydroxy cyclohexyl phenyl ketone, (HCPK), labeled monomer (0.018 g, 0.067 mmol) was copolymerized with methacrylic acid (0.85 ml, 10 mmol) initiated by AIBN (0.8 mg) in 1,4-dioxane (3 ml) at 65° C. The proportion of the HCPK initiator was determined by measuring UV absorption using the extinction coefficient of free HCPK molecule in methanol.

§ 4.2.2.4.3 Benzoin Covalently Appended to PMA

Benzoin (BZ) appended monomer was synthesized by the same method as described above. Benzoin (0.849 g, 4.0 mmol) was reacted with methacryloyl chloride (0.63 ml, 6.45 mmol) and triethylamine (0.9 ml, 6.45 mmol) in 10 ml of dried CH$_2$Cl$_2$ at room temperature. $^1$H-NMR for BZ-MA (monomer): δ1.98 (s, 3H), 5.57 (s, 1H), 6.21 (s, 1H), 6.81 (s, 1H), 7.25-7.51 (m, 8H), 7.86 (m, 2H).

Benzoin-labeled monomer (0.014 g, 0.05 mmol) was copolymerized with methacrylic acid (0.85 ml, 10 mmol) initiated by AIBN (0.8 mg) in 1,4-dioxane (3 ml) at 65 ° C. The proportion of the BZ initiator was determined by measuring UV absorption using the extinction coefficient of free benzoin molecule in methanol.

In the cases of the HCPK and the BZ photoinitiator appended PMAs, a smaller amount of the photoinitiator-appended monomers were used because their copolymers have poor solubilities in water.

§ 4.2.2.5 Characterization of Photoinitiator-Appended PMAs

§ 4.2.2.5.1 Methylation of Poly(Carboxylic Acid) for GPC and NMR Measurements 1,8-Diazabicyclo[5,4,0]undec-7-ene(DBU) (0.3 ml, 2.01 mmol) was added to the solution of PMA (100 mg, 1.16 mmol) in DMSO (5 ml). After 1 hour of stirring, CH$_3$I (0.13 ml, 2.01 mmol) was added into the reaction mixture and the solution was stirred overnight at room temperature. Reaction was quenched by adding acetic acid. The solution was poured into the water with stirring, and then the polymer was filtered and washed several times with a saturated $Na_2CO_3$ aqueous solution. After washing with methanol, polymer was dissolved with either THF or acetone and precipitated by methanol followed by drying in the vacuum oven at 40° C. Completion of methylation was checked by NMR. $^1$H-NMR and $^{13}$C-NMR were carried out by using Brucker 300 MHz NMR Spectrometer.

4.2.2.5.2 Molecular Weight Measurement by Gel Permeation Chromatography (GPC)

The weight average molecular weights and polydispersities ($M_w/M_n$) of the various polyelectrolytes studied were determined after exhaustive methylation of the carboxylic acid groups. Polymer solutions for GPC measurement were prepared by dissolving of the polymer in $CHCl_3$ (HPLC grade, purchased from EM Science) with a concentration of 0.1%. GPC analysis was performed by using a Waters 510 pump equipped with TSK Gel analytical columns, $G4000H_{XL}$, $G5000H_{XL}$ and $GMH_{XL}$ (TosoHaas), calibrated with PMMA standards (Polyscience) in chloroform in line with a dual detector system consisting of Waters R401 Differential reflectometer and 440 Absorbance detector.

| Sample | $M_w$ | $M_w/M_n$ | PI labeling percentage |
|---|---|---|---|
| HHMP-PMA | 850,000 | 1.68 | 1.5 mol % |
| HCPK-PMA | 740,000 | 1.49 | 0.65 mol % |
| BZ-PMA | 780,000 | 1.5 | 0.33 mol % |

§ 4.2.2.5.3 Buffer Preparation

All the buffer solutions in this study were made by either acetate buffer or mono-and dibasic phosphate buffer ($K_2PO_4/KH_2PO_4$) with a constant concentration based on the potassium ion ([K+]=0.2 M).

§ 4.2.2.6 Fluorescence Measurement of Photoinitiator HHMP: in the Absence and Presence of PMA in Water A Perkin-Elmer LS50B Luminescence spectrophotometer was used. A series of fluorescence measurements at varying pH was carried out. The pH was measured using an accumet model 15 pH meter within ±0.01 error range (Fisher Scientific).

2-Hydroxy-4'-(2-hydroxyethoxy)-2-methyl propiophenone (HHMP) was dissolved in distilled water with a concentration of $6.47 \times 10^{-4}$ M with or without 0.01M PMA in the solution. The pH of the solution was adjusted by adding small amounts of either 1.0 M HCl or 1.0 M KOH aqueous solution. Oxygen was removed from the sample by bubbling of $N_2$. Emission spectrum was taken by excitation at 270 nm.

§ 4.2.2.7 Kinetic Measurement of the UV Absorption Decay of the Photoinitiator Upon UV Irradiation For this study, each photoinitiator appended PMA sample was dissolved in distilled water with a concentration of 0.1M and placed in the UV cell. Then, the solution was irradiated by UV light ($\lambda_{max}$~365 nm, medium pressure mercury lamp, Model 100AP from UVP) 15 minutes each, three times. UV spectrum of the solution was taken before and after each irradiation. The apparent bond cleavage rate of the each photoinitiator was determined from the graph that was plotted by the equation below. $\ln A_i/A_o = -kt$ ($A_i$: absorbance after irradiation, $A_o$: absorbance before irradiation)

§ 4.3 Hydrogels Produced Using a pH Dependent Free Radical Case

§ 4.3.1 Photoinitiation of Acrylamide Polymerization With the Photoinitiator-Labeled PMA in Water The PMA clustering effect on the unbound and bound photoinitiators by means of the spectroscopic measurements was described in § 4.2 above. The photoinitiation of a water-soluble monomer, acrylamide, with the photoinitiator appended to PMA (PI-PMA) is now described.

In one embodiment, to avoid a viscosity effect of the initiator labeled polymer solution on the polymerization of acrylamide, the concentration of the PI-PMA was controlled to 0.01 M and 0.1 M monomer was added to the solution. In the following exemplary embodiments, photoinitiator-appended PMA's were synthesized with three different photoinitiators. The HHMP-appended PMA is preferred.

§ 4.3.1.1 Photopolymerization of Acrylamide by HHMP-PMA as a Function of pH

In the following exemplary embodiments, the photopolymerization of acrylamide by the HHMP appended to PMA was tested at four different pH's. The pH's of solutions were adjusted to 4.2, 5.43, 6.38 and 9.4, respectively. Upon irradiation, the reaction mixture at pH 4.2 turned slightly turbid and a trace amount of white precipitate was obtained. The viscosity of the solution at pH 5.43 was hardly changed upon irradiation and the solution remained clear. At pH's of 6.38 and 9.4, gelation occurred after several minutes of irradiation. (See FIG. 17.)

In each case, these gels were taken out from the tube and washed with large amounts of distilled water. Precipitation into methanol gave a completely contracted powder of the gel. This powder form of the polymer reforms a hydrogel by adding water. Interestingly, the strength of the gel depends on the method of precipitation of the polymer in methanol. More specifically, the absence of stirring leads to a slow contraction of the polymer and allows the gelled polymer to have one piece of white precipitate. When stirring was applied to the precipitation process, the polymer was torn apart to little pieces of white powder. In both cases, the polymer forms a gel by adding water. However, the gel that was obtained from the precipitates in the absence of stirring exhibited stronger gel properties as judged by approximate rheological testing.

When fragmentation of the photoinitiator takes place, there can be two radicals in the system. One is a benzoyl radical which is attached to the polymer backbone. The other is a ketyl radical which can be freely released from the polymer.

If the benzoyl radical initiates the polymerization of the acrylamide monomer, it generates a graft copolymer. On the other hand, if the released ketyl radicals initiate polymerization, this may lead to linear polyacrylamide. FIG. 9 illustrates these two probable polymer formation routes.

It was widely believed that the ketyl radicals (2-hydroxy-2-propyl radical) are less reactive than benzoyl radicals and do not contribute to the initiation of the polymerization. (See, e.g., Dietliker, K., *Photoinitiators for Free Radical and Cationic Polymerization* (SITA Technology: London, 1991) Vol. 3. This work is incorporated herein by reference.) However, a paper recently published claims that the ketyl radical is more reactive than benzyl radical. (Vacek, K. G.; Beckert D.; Mehanert R., *J. Chem. Soc. Perkin Trans.*, 2, 2469 (1999). This article is incorporated herein by reference.) However, the inventors found that when acrylamide was polymerized with the photoinitiator-labeled PMA at pH 9.4, a linear polyacrylamide was not obtained. The residue from the rinsing water was examined after filtering the gel. There was no evidence for the presence of the linear polymer. At high pH, the ketyl radicals could change to the corresponding anion. These anions may not be effective for initiation as much as the uncharged radicals.

In practicing this embodiment of the invention, even if some ketyl radicals freely escaped from the PMA cluster and could initiate polymerization of acrylamide, this would produce only a linear polyacrylamide, which is soluble in water. Since linear polymers of PAAm and PMA are water soluble, the gels that were obtained at high pH's, which were washed with a large excess of water, could not be homopolymers. Therefore, they were certainly graft-copolymers of PMA and PAAm (PMA-g-PAAm) as drawn in FIG. 9.

Linear polymers of PMA and PAAm were mixed in water, as a control experiment. Both polymers were miscible and the solution mixture was clear until the pH of the solution was lowered below 4. At very low pH, turbidity in the mixture was observed. Presumably, this precipitation was caused by the complexation of PMA and PAAm via hydrogen bonding between acid and amide groups, to be discussed below.

The initiating reactivity of the benzoyl radical toward the acrylamide monomer can be measured by the degree of the polymerization of the grafted polymer, which may be an indicator of the cage effect of the PMA cluster. The degree of the polymerization (DP) of polyacrylamide in the graft copolymer was determined by nitrogen analysis of the isolated polymer (elemental analysis). Information about the degree of the polymerization (DP) and the initiator labeling percentage of the photoinitiator-labeled PMA was predetermined. Using this information, the DP of the PAAm part in the sample can be determined based on the ratio of carbon and nitrogen percentages by equation 11 and 12 with the parameters (x, y, $n_A$, $n_B$, $F_C$, $F_N$, Z). FIG. 10 shows the structure of the PMA-g-PAAm along with the structure of the initiator-containing HHMP-PMA. The number of carbons in equation 1 is based on the numbers from the HHMP-PMA and PAAm and the numbers of nitrogen comes only from PAAm.

The number of the repeating units (n, DP) of the whole chain of the HHMP-PMA was calculated to be 9880, which is based on the molecular weight that was measured by GPC, when calculated according to the composition of HHMP-PMA, the number of the methacrylic acid and photoinitiator labeled methacrylate grafts is 9700 and 150 respectively.

The number of carbons in the PMA-g-PAAm is 4 from the MA unit, 13 from the HHMP-MA units and 3 for the AAm unit. In case of the nitrogen, the number is one; it only comes from the AAm unit. Therefore, the total number of repeating units of the AAm can be determined based on the carbon and the nitrogen ratio by the following equations (12). The average DP of grafting (average number of Z in the FIG. 10) was calculated by dividing the total number of PAAm units in a macromolecule by the total number of the HHMP-MA units in a macromolecule ($n_B$-150), assuming that all photoinitiators lead to the same grafting (table 4).

$$F_c=(4\times12{,}700)+(13\times12\times150)+(3\times12\times Z)=(4.89\times10^5)+36\,Z \quad \text{(eq. 2-1)}$$

$$F_N=1\times14\times Z=14\,Z \quad \text{(eq. 2-2)}$$

$$\frac{F_C}{F_N} = \frac{36Z + (4.89\times10^5)}{14Z} = 2.57 + \frac{35000}{Z} \quad \text{(eq. 2-3)}$$

$$Z = \frac{35000}{\frac{F_C}{F_N} - 2.57} \quad \text{(eq. 2-4)}$$

$$Z_{ave} = \frac{Z}{n_B} \quad \text{(eq. 2-5)}$$

The gel polymer samples for the elemental analysis were purified by washing them with a large excess of water and precipitation into methanol. Methanol should remove any unreacted PMA or acrylamide monomer from the sample. Samples for the low pH solutions were isolated by adding concentrated HCl into the solution (since PMA is known to be precipitated by concentrated HCl). The precipitates, therefore, should contain mainly PMA with or without the grafted PAAm chains. The results of the elemental analyses of theses samples are listed in Table 4.

In general, the degree of the polymerization of acrylamide increased with an increase of pH of the reaction mixture. The data in the last row in Table 4 were obtained from stepwise irradiation of the sample at different pH's. It was initially irradiated at pH 5.4 for 15 minutes. Then the pH of the solution was raised to pH 9.4 followed by irradiation for an additional 15 minutes. The 2nd irradiation yielded a very viscous solution and fibrous white powders could be isolated on addition of methanol to the mixture. This isolated white powder forms a gel.

TABLE 4

The results of the elemental analysis.

| Sample pH | C % | N % | (C/N) | Total number of PAAm units | $Z_{ave}$ |
|---|---|---|---|---|---|
| 4.2 | 26.20 | 1.18 | 22.2 | 1800 | 12 |
| 5.4 | 30.72 | 5.13 | 5.99 | 10200 | 68 |
| 6.38 | 37.69 | 8.86 | 4.25 | 21000 | 140 |
| 9.4 | 40.98 | 12.24 | 3.35 | 45000 | 300 |
| 5.4[a] | 46.19 | 12.75 | 3.62 | 33200 | 220 |
| 4.2[b] | 47.58 | 8.44 | 5.64 | 11400 | 76 | a. pH of the sample was initially 5.4, after 15 min. irradiation, the pH of the solution was raised to 9.4 and irradiated again.
b. Nitrogen analysis of the filtered white powder from reaction mixture at pH 4.2

As shown in the Table 4, this precipitate contains a large portion of AAm chains (DP=33200), which is close to the value obtained in a one step irradiation at pH 9.4 and still more than three times larger than the value from one step irradiation at pH 5.4. This indicates that some portions of the initiators at pH 5.4 can recombine inside of the PMA cluster upon irradiation and still can produce active radicals later when the pH is increased to open the PMA clusters.

However, when the same experiment as described above was performed with the sample at pH 4.2, no further reaction occurred. The viscosity of the solution was not changed and no more polymers were isolated. This indicates that the cage effect causes recombination of the photochemically produced radicals at pH 5.4, but not at the lower pH. At the lower pH, the cage, although restricting the radicals from causing polymerization in the water solution, nevertheless allows radical reactions that destroy the initial photoinitiator structure.

§ 4.3.1.2 Hydrogel: Formation and Swelling Behavior as a Function of pH

The transparent gel obtained by UV irradiation of the HHMP-PMA and acrylamide mixture at high pH showed interesting properties. The gel obtained at pH 6.38 was weaker than that synthesized at pH 9.4. These gels turned to a powder when placed in a large excess of methanol. This white powder reformed a gel in water and contracted in methanol reversibly. Precipitates without stirring performs stronger gel formation than the powder prepared by stirring.

FIG. 11 illustrates the swelling behavior of the gel that was obtained at pH 9.4 as a function of pH. The swelling ratio was measured by the ratio of the weight of the swollen gel, which was immersed in the aqueous buffer solution with a constant concentration of the salt ($[K^+]$=0.1 M) for 24 hours, to the weight of the dried gel. As seen in FIG. 11, the gel swells even at low pH and the swelling ratio was increased smoothly by the increase of the pH of the soaking solution. At high pH, the swelling factor was increased to more than two orders of magnitude of the weight of the dried sample. This polymer may be a "superabsorbant" hydrogel. (DeRossi, D., *Polymer Gels* (Plenum Press: New York, 1991). This work is incorporated herein by reference.) Briefly stated, FIG. 11 shows the pH reversible swelling behavior of the gel.

Two pieces of the polymer powder with the same weight were prepared and each of them was immersed in the buffer solutions at pH 4.2 and 9.6, respectively, for 24 hours. The excess of the solutions was decanted and the buffer solutions were switched. That is, the swollen gel at pH 4.2 was put into the pH 9.6 buffer solution and the swollen gel at pH 9.6 was placed into the pH 4.2 buffer solution. After 24 hours of immersion, the extra solution was discarded and the gel weighed. As seen in FIG. 12, the contraction of the gel that was swollen at high pH first and contracted at low pH, reached the equilibrium value within 24 hours. However, the gel swollen at low pH first swelled slowly at high pH. It took 4 days to reach the usual swelling ratio observed at the high pH.

The swelling factor of the gel obtained by the photopolymerization at pH 6.38 (Table 5), had a smaller swelling ratio than that of the gel obtained at pH 9.4.

TABLE 5

The swelling ratio of the gel obtained by the photopolymerization of acrylamide with HHMP-PMA at pH 6.38

| pH | 4.2 | 6.38 | 9.0 |
|---|---|---|---|
| $W_{swollen\ gel}/W_{dried\ gel}$ | 17.7 | 30.9 | 31.0 |

This suggests that the pH of the polymerization medium determines the swelling property of the resulting gel.

The inventors believe that hydrogen bonding between acid and amide may be the driving force of the hydrogel formation. Hydrogen bonding is known to make an interpenetrating gel network (IPN) of PAA and PAAm (Katono, H.; Maruyama, A.; Sanui, K.; Ogata, N.; Okano, T.; Sakurai, Y., *J. Controlled Release,* 16, 215 (1991). This article is incorporated herein by reference.) or PDMAAm. (Aoki, T.; Masahiko, K.; Katono, H.; Sanui, K.; Ogata, N.; Okano, T.; Sakurai, Y., *Macromoleecules,* 27, 947 (1994). This article is incorporated herein by reference.) PAAm and PAA are known to complex with polymers which are hydrogen bonds acceptors. (Silberberg, A.; Eliassaf, J.; Katchaisky, A., *J. Polym. Sci.,* 23, 259 (1957). Wang, Y.; Morawetz, H., *Macromolecules,* 22, 164 (1989). Katono, H.; Maruyama, A.; Sanui, K.; Ogata, N.; Okano, T.; Sakurai, Y., *J. Controlled Release,* 16, 215 (1991). These articles are incorporated herein by reference.) At low temperature, the two polymers form complexes by intermolecular hydrogen bonding, as shown in FIG. 15, resulting in dehydration and precipitation. At higher temperatures, the hydrogen bonds of the complex dissociate leading to the solubilization of the polymers. (Katono, H.; Maruyama, A.; Sanui, K.; Ogata, N.; Okano, T.; Sakurai, Y., *J. Controlled Release,* 16, 215 (1991). This article is incorporated herein by reference.)

Since the polymerization was carried out in the absence of crosslinking agent such as N,N,-bisacrylamide, another possibility of gel formation is by crosslinking via recombination of two growing grafted chains. (See FIG. 18.) However, this possibility is inconsistent with the observation that the polymer gel dissolved in 7.0 M urea aqueous solution (room temperature with stirring). Urea has been used to break the hydrogen bonds between acid-amide chains that exist in PAA. and PAAm or PDMAAm by many researchers including Aoki et al. (Aoki, T.; Masahiko, K.; Katono, H.; Sanui, K.; Ogata, N.; Okano, T.; Sakurai, Y., *Macromoleecules,* 27, 947 (1994). This article is incorporated herein by reference.) After removing urea by dialysis, the graft copolymer was isolated by adding methanol and it reformed the gel. Urea is a well known denaturant for breaking of hydrogen bonds in proteins or DNA.

It was expected, therefore, that the hydrogen bonding between acids and amides might play an important role in the PMA-g-PAAm hydrogel system. Hydrogen bonds would connect the whole system forming a physical gel in an aqueous system without precipitation. However, since the gel existed at all pH's, there should still be some of hydrogen bonding interaction between chains even at high pH where most —$CO_2H$ groups are converted to —$CO_2^-$ (FIG. (13 b)).

PMA-g-PAAm is a copolymer with a high density of grafts (See FIG. 14.), which may cause difficulty in hydrogen bonding between carboxylic groups and amides. The number of the acrylamide (AAm) repeating units in the graft (300) is about 5 times larger than the number of the methacrylic acid (MA) repeating units between grafting points (65), which was estimated by dividing the total number of the HHMP-PMA unit (9880) by the total number of HHMP-MA unit (150). It may be difficult for a grafted PAAm chain to penetrate into the other PAAm grafted chains on the other PMA chain to reach the carboxylic groups of the PMA. Therefore, amide—amide interactions, as well as amide-acid interactions, may contribute significantly to the network formation. Hydrogen bonds between amide groups in PAAm could be the reason why the complexes between PDMAAm and PAA dissociate at higher temperature (70° C.) than PAAm-PAA complexes (25° C.). Alkylated amide groups in PDMAAm only can act as hydrogen acceptors, therefore, there is no intramolecular hydrogen bonds in PAAm. On the other hand, amide groups in PAAm can be hydrogen-bond donors or acceptors.

Although gels have been intensively studied for decades, there are only relatively few examples of physical gels in water, that is, that are not covalently crosslinked. As mentioned in § 1.2.3.1 above, most are biopolymers. Further, physical cross-linking requires high concentration of the polymer. In the examples described, gelation occurred in very dilute solution.

Graft copolymer gels are a relatively new subject in hydrogel re-search. A graft copolymer of PMA. and poly (ethylene glycol) (PEG) has been developed for a gel, which responds to the pH change of the system with a change of volume. (Hassan, C. M.; Doyle III, F. J.; Peppas, N. A., *Macromolecules*, 30, 6166 (1997). This article is incorporated herein by reference.) However, this copolymer is actually not a purely grafted copolymer but a chemically crosslinked network using the cross-linker, N,N'-bisacrylamide. Hoffman et al. (Chen, G.; Hoffman, A. S., *Nature*, 373, 49 (1995). This article is incorporated herein by reference.) reported a graft copolymer consisting of PNIPAAm and PAA, which exhibited temperature-induced phase transition.

The inventors can demonstrate that the gel described here is not chemically cross-linked since it dissolves in urea solution. After the urea was removed by dialysis and methanol, this polymer still formed a gel. In the following section, the hydrogen bonding interaction in the gel using a graft copolymer of the stronger hydrogen bond acceptor N,N-dimethyl acrylamide (DMAAm) is discussed. As will be seen, two other water soluble monomers as well as acrylamide could be used to form the hydrogel. These are N,N-dimethylacrylamide and N-isopropylacrylamide. Alternatively, other water soluble monomers that are capable of hydrogen bonding could be used in this invention, and will form hydrogels by the grafting procedure of this invention. Those skilled in the art of water soluble polymers and hydrogels will recognize that the invention can be applied widely to many water soluble monomers to form the graft to the cage forming polyelectrolyte.

§ 4.3.2 Photoinitiation of N, N-DIMETHYL Acrylamide Polymerization with the Photoinitiator-LABELED PMA in Water The inventors attempted to photopolymerize N,N-dimethylacrylamide by using HHMP-PMA to explore the effect of the hydrogen bonding on the gel formation as a function of pH. In case of the graft copolymer of PMA and poly(dimethyl acrylamide) (PDMAAm), in contrast to the PMA-g-PAAm, no hydrogen bonds can form between the polyacid and polyamide at high pH as shown in FIG. 15(b). Also, since a dimethyl acrylamide is a very strong hydrogen bond acceptor, and no hydrogen bonds between PDMAAm are expected (see FIG. 14(b)), gel formation might be found at low pH. However, at low pH, the yield of the photopolymerization of N,N'-dimethylacrylamide was low as was the case with acrylamide, and no gel formation was observed. This is a consequence of the cage effect.

Gelation, however, occurred at pH 9.4 upon polymerization. Even in the case of DMAAm monomer, at low pH where the PMA chains can form hydrophobic cages around initiator fewer grafts were obtained than at high pH. The polymer that was obtained at high pH was purified by diethyl ether. This polymer formed a weak, almost fluid-like gel in water at pH above 10, but the gel became stronger at low pH (aqueous buffer solution, pH 4.2). This indicates that there are hydrogen bonds between the acid and amide groups at low pH where the carboxylic acid groups act as a hydrogen bond donor and amide groups act as hydrogen bond acceptors. The gel in water at low pH was not as transparent as the gel obtained from the PMA-g-PAAm. This may be due to a phase separation caused by the complexation of PMA chain and PDAAm side chain (complex coacervation).

The inventors also synthesized PMA-g-PAAm with 10% of the crosslinker, N, N-bisacrylamide. This cross-linked polymer formed a strong gel, but not a transparent gel, at any pH. The swelling factor of this gel was smaller than the gels obtained without cross-linker. This shows one of the advantages of a physical gel since the network can shrink and expand without the kinds of irreversible restrictions arising from covalent crosslinks found in chemical gels.

In addition, the inventors used the pH dependent cage effect to form a graft of PMA with N-isopropyl acrylamide in water. This system behaved as did the use of acrylamide and dimethyl acrylamide in forming a graft at high pH. In this case, however, the gel underwent a phase change at near to 32 degrees C as is well known in the art for poly(N-isopropylacrylamide) in water. In this way, a hydrogel can be formed at any temperature. However, the gel lost its transparency at temperatures above about 32 degrees C as the N-isopropylacrylamide part underwent a phase separation from the water solution. This led also to a stiffening of the gel, which can be expected by those expert in the properties of hydrogels, since the isopropylacrylamide moieties would aggregate adding to the H-bonding crosslinks holding the gel at lower temperatures. This use of varying water soluble monomers demonstrates the wide applicability of the PMA labeled photoinitiator and its cage effect. In addition, it is clear that any water soluble polyelectrolyte can be labeled with a photoinitiator to form grafts. Regarding the formation of hydrogels, having the cage effect controlling the photoinitiation may not be necessary. In that case, the ability to form grafts to water soluble polymers by using copolymerized photoinitiator groups is of general use for this invention and is covered by this invention.

§4.3.3 pH Dependent Complexation of Cyclodextrin With Photoinitiator-Appended PMP. Demonstration of the Formation of the Cluster, Which Would Form the Cage Below About pH 5.5 On Irradiation.

α-, β- and γ-cyclodextrins were used as received from Aldrich. The pH of the sample solution was measured using an accumet model 15 pH meter within ±0.01 error range (Fisher Scientific). The circular dichroism spectrum of the solution was measured by JASCO J-710 spectropolarimeter at 20° C.

Generally, the polymer solution was prepared as follows. To 0.01 M polymer aqueous solution was added cyclodextrins (20:1 molar ratio of cyclodextrin to label) and adjusted pH by 0.1 M HCl and 0.1M KOH with buffer. Total potassium salt concentration was adjusted by adding KCl as 0.1 M.

§ 4.3.3.1 Complexation of Cyclodextrn With Photoinitiator Unbound to PMA

The circular dichroism of the photoinitiator in the presence of the cyclodextrin was measured with and without PMA solution. In both experiments, the photoinitiator HHMP was dissolved in distilled water with a concentration of 0.0007M. Atactic polydisperse PMA ($M_W$–700K, PDI= 1.8) was used at 0.01 M concentration. The pH of the solution was adjusted by an addition of 1.0 M KOH or 1.0 M HCl α-, β-, or γ-Cyclodextrins were added into the solution with a concentration of 0.021 M.

§ 4.3.3.2 Complexation of Cyclodextrn With Photoinitiator Bound to PMA

The same procedure as described above was used with 0.01 M PMA aqueous solution.

§ 4.3.4 Photopolymerization

§ 4.3.4.1 Photopolymerization of Acrylamide With the Unbound HHMP

The monomer (acrylamide) and the photoinitiator, 2-Hydroxy-4'-(2-hydroxyethoxy)-2-methyl propiophenone (HHMP), were dissolved in distilled water with a concentration of 0.7 M and $4 \times 10^{-4}$ M respectively (monomer: initiator=1750:1). The pH range of this study was from about 4 to 10. The pH of the solution was adjusted by adding a small amount of 1.0 M KOH or HCl and buffered. The mixture was poured into a Pyrex ampule for photopolymerization, degassed and sealed. Then the ampule was exposed to the UV light ($\lambda_{max}$~365 nm) irradiation for 15 minutes. The UV lamp was turned off after 10 minutes and the reaction was quenched by adding cold methanol into the solution and the polymer was precipitated out.

§ 4.3.4.2 Photopolymerization of Acrylamide With the Unbound HHMP in the Presence of PMA The concentration of the monomer, acrylamide (0.7 M) and the photoinitiator as above are used for this experiment. HHMP ($4\times10^{-4}$ M) is dissolved in the 0.5 M PMA aqueous solution. The pH of the solution is adjusted and buffered in the same way as above. The reaction mixture was irradiated by UV light ($\lambda_{max}$~365 nm) for 15 minutes. The polymer was isolated by adding methanol.

§ 4.3.4.3 Photoinitiation of Acrylamide With Photoinitiator (HMMP)-Labeled PMA in Water Photopolymerization of acrylamide with photoinitiator appended PMA (PI-PMA) was examined under the following conditions; 18 mg of acrylamide was added into 2.5 ml of 0.01M or 0.02M of photoinitiable polymer aqueous solution, pH of the solution was adjusted and controlled by 0.5 ml buffer solution. Irradiation was performed by UV light at 365 nm (medium pressure mercury lamp, Model B 100 AP from UVP inc.) for 15 minutes. After polymerization occurred, cold methanol was added into the reaction mixture. The precipitates were dissolved in water and reprecipitated by methanol. Photoinitiable PMA was dissolved in methanol and poly(acrylamide) (PAAm) was precipitated out.

The pH of the reaction mixture (2.5 ml of solution containing 0.01 M PI-PMA and 0.1 M acrylamide monomer) was adjusted with a small amount of 1.0 M KOH or HCl solution and then buffered with a phosphate or acetate buffer (0.5 ml of 2.0 M [K+] buffer). The solution was then placed into a polmerization tube (Pyrex® Airfree ampule), degassed by purging with argon gas and removing air under vacuum and then the ampule was sealed by flame. A medium pressure mercury lamp ($\lambda_{max}$~365 nm) was used as a light source of irradiation. The irradiation time was controlled as 15 minutes for each sample. After irradiation, the polymerization was quenched by adding methanol into the solution. The polymer was isolated by adding methanol. The white fibrous polymer was dissolved (washed in the case of the graft copolymer of PMA and polyacrylamide) in water and reprecipitated by methanol.

§ 4.3.4.4 Photoinitiation of N,N-dimethyl Acrylamide With the Photoinitiator (HMMP)—Labeled PMA in Water By using the same method in the photopolymerization of the acrylamide with the HHMP-labeled PMA, N,N'-dimethylacrylamide was reacted with HHMP-PMA at low and high pH. The photoinitiator labeled PMA, HHMP-PMA, was dissolved in distilled water with a concentration of 0.01 M and N,N'-dimethylacrylamide monomer was added with a concentration of 0.1M. This solution was divided by two and the pH's of the solutions were adjusted and buffered to 4.2 and 9.4 respectively. UV ($\lambda$~365 nm) irradiation time was controlled by 15 minutes. Medium pressure mercury lamp was used for photoinitiator.

§ 4.3.4.5 Photoinitiation of Acrylamide With HCPK-Appended PMA in Water 1-hydroxy cyclohexyl phenyl ketone (HCPK) appended PMA was used for photoinitiation of acrylamide with the same condition described in the photopolymerization of acrylamide initiated by HHMP-PMA. HCPK-labeled PMA was dissolved in distilled water (5 ml) with a concentration of 0.01M. To this solution, acrylamide (0.0355 g) was added and the pH of the solution was adjusted with a small amount of either 1.0 M HCl or 1.0 M KOH and buffered. Then, the solution was irradiated for 15 minutes.

§ 4.3.4.6 Photoinitiation of Acrylamide With BZ-Appended PMA IN Water

The reaction condition followed the same method as described above.

What is claimed is:

1. A method for generating a hydrogel, the method comprising:
   a) providing water soluble monomers capable of free radical polymerization in an aqueous solution;
   b) providing, in the aqueous solution, a compound, the compound including
      i) radicals for initiating a polymerization of the water soluble monomers, and
      ii) a responsive cage for hosting the radicals, wherein, under a first set of conditions the responsive cage contains the radicals long enough to recombine before they escape and initiate the polymerization of the water soluble monomers, and wherein, under a second set of conditions the responsive cage releases the radicals so that they may initiate the polymerization of the water soluble monomers; and
   c) adjusting the aqueous solution so that the responsive cage releases the radicals so that they may initiate the polymerization of the water soluble monomers.

2. The method of claim 1 wherein the first set of conditions includes providing the aqueous solution with a first concentration of water miscible solvents, and wherein the second set of conditions includes providing the aqueous solution with a second concentration of water miscible solvents.

3. The method of claim 1 wherein the first set of conditions includes providing the aqueous solution with a first salinity level, and wherein the second set of conditions includes providing the aqueous solution with a second salinity level.

4. The method of claim 1 wherein the radicals are attached covalently to the water soluble polymers so that the water soluble monomer forms a graft copolymer.

5. The method of claim 1 wherein the aqueous solution is water including salt or a water miscible solvent.

6. The method of claim 1 wherein the radicals and responsive cage collectively include a photoinitiator appended to PMA, and
   wherein the monomer is acrylamide.

7. The method of claim 1 wherein the responsive cage includes a PMA and PAAm.

8. The method of claim 1 wherein the first set of conditions includes providing the aqueous solution at a first range of pH's, and wherein the second set of conditions includes providing the aqueous solution at a second range of pH's.

9. The method of claim 8 wherein the first range of pH's includes pH's below about 5.4.

10. The method of claim 8 wherein the second range of pH's includes pH's above about 5.4.

11. The method of claim 1 wherein the radicals are formed on a water soluble polymer that does not form a cage, but which is labeled with the photoinitiator responsible for forming the radials.

12. The method of claim 11 wherein the photoinitiator covalently bound as a label to the water soluble polymer may be of Type I or II, and wherein the water soluble polymer may be of any structure allowing non-covalent interactions, which yield physical crosslinks capable of sustaining formation of a hydrogel.

13. The method of claim 1 wherein the radicals are formed by radiation with light of appropriate wavelength, the method further comprising:

c1) applying radiation with light of appropriate wavelength to the compound.

14. The method of claim 13 wherein the radiation with light of appropriate wavelength is applied for several minutes and wherein the aqueous solution has a pH above about 5.4.

15. The method of claim 14 further comprising:
  d) removing a gel formed by the polymerization of the monomers;
  e) washing the gel; and
  f) precipitating the washed gel into methanol or another appropriate precipitating solvent thereby generating a contracted powder of the gel.

16. The method of claim 15 wherein the act of precipitating the washed gel includes stirring.

17. The method of claim 15 wherein the act of precipitating the washed gel is done in the absence of stirring.

18. The method of claim 1 wherein the radicals include HHMP, wherein the responsive cage includes PMA, and wherein the monomer is acrylamide.

19. The method of claim 18 wherein a gel generated by the method is stronger when formed at a higher pH than when formed at a lower pH.

20. The method of claim 18 wherein a gel generated by the method swells more when formed at a higher pH than when formed at a lower pH.

21. A hydrogel comprising:
  a) acrylamide initiated by HHMP, and
  b) PMA labeled with a photoinitiator that formed a site of a graft copolymerization.

22. The hydrogel of claim 21, being a physical gel formed by noncovalent crosslinks.

23. The hydrogel of claim 21, being formed from a dilute solution of the graft copolymer in the range of less than 5–10 mg. of polymer per ml. of water.

24. The hydrogel of claim 21, swelling at high pH's and contracting at low pH's.

25. The hydrogel of claim 21, being clear to the eye.

26. A hydrogel comprising PMA labeled with HHMP that formed the radicals necessary for graft with the graft comprised of N-dimethylacrylamide.

27. The hydrogel of claim 26, having rheological properties strongly dependent on pH.

28. The hydrogel of claim 26, being clear.

29. The hydrogel of claim 26, swelling and contracting with changes of pH.

30. A hydrogel comprising PMA labeled with HHMP that formed the radicals necessary for the graft comprised of N-isopropylacrylamide.

31. The hydrogel of claim 30, having rheological properties strongly dependent on pH.

32. The hydrogel of claim 30, being clear below about 32 degrees C, but becoming cloudy above that temperature.

33. The hydrogel of claim 32, wherein the temperature dependent opacity is fully reversible.

34. The hydrogel of claim 30 wherein, above about 32 degrees C, the hydrogel stiffens, and wherein the hydrogel relaxes below about that temperature.

35. A hydrogel generated by a process comprising:
  a) providing water soluble monomers capable of free radical polymerization in an aqueous solution;
  b) providing, in the aqueous solution, a compound, the compound including
    i) radicals for initiating a polymerization of the water soluble monomers, and
    ii) a responsive cage for hosting the radicals, wherein, under a first set of conditions the responsive cage contains the radicals long enough to recombine before they escape and initiate the polymerization of the water soluble monomers, and wherein, under a second set of conditions the responsive cage releases the radicals so that they may initiate the polymerization of the water soluble monomers; and
  c) adjusting the aqueous solution so that the responsive cage releases the radicals so that they may initiate the polymerization of the water soluble monomers.

36. The hydrogel of claim 35 wherein the first set of conditions includes providing the aqueous solution at a first range of pH's, and wherein the second set of conditions includes providing the aqueous solution at a second range of pH's.

37. The hydrogel of claim 35 wherein the first set of conditions includes providing the aqueous solution with a first concentration of water miscible solvents, and wherein the second set of conditions includes providing the aqueous solution with a second concentration of water miscible solvents.

38. The hydrogel of claim 35 wherein the first set of conditions providing the aqueous solution at a first salinity level, and wherein the second set of conditions includes providing the aqueous solution at a second salinity level.

39. The hydrogel of claim 35 wherein the radicals are attached covalently to the water soluble polymers so that the water soluble monomer forms a graft copolymer.

40. The hydrogel of claim 35 wherein the radicals are formed by radiating photoinitiators, the process further comprising:
  c1) applying radiation with light of appropriate wavelength to the compound.

41. The hydrogel of claim 36 wherein the first range of pH's are below about 5.4.

42. The hydrogel of claim 36 wherein the second range of pH's is above about 5.4.

* * * * *